(12) United States Patent
Yeh et al.

(10) Patent No.: US 8,633,717 B2
(45) Date of Patent: *Jan. 21, 2014

(54) METHOD AND DEVICE FOR DETERMINING IMPEDANCE OF DEPRESSION

(75) Inventors: Shang-Tai Yeh, Taipei (TW); Jia-Ming Chen, Taipei (TW); Shun-Lung Ho, Taipei (TW)

(73) Assignee: Egalax_Empia Technology Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,164

(22) Filed: Sep. 20, 2011

(65) Prior Publication Data

US 2012/0007610 A1 Jan. 12, 2012

Related U.S. Application Data

(63) Continuation of application No. 12/761,930, filed on Apr. 16, 2010, now Pat. No. 8,536,882.

(60) Provisional application No. 61/301,661, filed on Feb. 5, 2010, provisional application No. 61/245,063, filed on Sep. 23, 2009.

(30) Foreign Application Priority Data

Apr. 17, 2009 (TW) ............................... 98112745 A

(51) Int. Cl.
*G01R 27/08* (2006.01)
*G01L 1/20* (2006.01)

(52) U.S. Cl.
CPC ..................................... *G01L 1/205* (2013.01)
USPC .......................................................... 324/691

(58) Field of Classification Search
None
See application file for complete search history.

(56) References Cited

U.S. PATENT DOCUMENTS

| | | | |
|---|---|---|---|
| 4,423,299 A | 12/1983 | Gurol et al. | |
| 4,526,043 A * | 7/1985 | Boie et al. | ................ 73/862.046 |
| 4,733,222 A | 3/1988 | Evans | |
| 4,893,115 A | 1/1990 | Blanchard | |
| 4,897,511 A * | 1/1990 | Itaya et al. | ................ 178/18.05 |
| 5,023,559 A | 6/1991 | Andermo | |
| 5,181,030 A | 1/1993 | Itaya et al. | |
| 5,270,711 A | 12/1993 | Knapp | |
| 5,386,219 A | 1/1995 | Greanias et al. | |

(Continued)

FOREIGN PATENT DOCUMENTS

| | | |
|---|---|---|
| CN | 1503195 | 6/2004 |
| CN | 1596413 | 3/2005 |

(Continued)

OTHER PUBLICATIONS

Liu Jinpu et al., Jul. 31, 2008, Probe into the Function of Touch Panel, p. 41-43, in Magazine of Office Automation.

*Primary Examiner* — Paresh Patel
(74) *Attorney, Agent, or Firm* — WAPT, PC; Justin King

(57) ABSTRACT

A method and the device for position detection are disclosed. The device comprises a plurality of strips intersecting each other to form a plurality of intersecting regions. A pair of depressed strips intersecting on an intersecting region contact to each other on a contact point to form a depressed intersecting region, wherein the contact impedance of the contact point is determined according to the position of the contact point and the voltages on the contact point of one and the other of the pair depressed strips.

8 Claims, 26 Drawing Sheets

(56) References Cited

U.S. PATENT DOCUMENTS

| | | | |
|---|---|---|---|
| 5,392,035 A * | 2/1995 | Yoshikawa | 341/5 |
| 5,648,642 A | 7/1997 | Miller et al. | |
| 5,730,165 A | 3/1998 | Philipp | |
| 5,889,236 A | 3/1999 | Gillespie et al. | |
| 6,504,492 B1 * | 1/2003 | Muurinen | 341/22 |
| 6,825,833 B2 | 11/2004 | Mulligan et al. | |
| 6,961,049 B2 | 11/2005 | Mulligan et al. | |
| 7,078,918 B2 | 7/2006 | Umeda et al. | |
| 7,154,481 B2 | 12/2006 | Cross et al. | |
| 7,180,508 B2 | 2/2007 | Kent et al. | |
| 7,348,966 B2 | 3/2008 | Hong et al. | |
| 7,825,905 B2 | 11/2010 | Philipp | |
| 7,847,789 B2 | 12/2010 | Kolmykov-Zotov et al. | |
| 8,049,730 B2 | 11/2011 | Joguet et al. | |
| 8,138,771 B2 * | 3/2012 | Nurmi | 324/654 |
| 2003/0103043 A1 | 6/2003 | Mulligan et al. | |
| 2003/0234771 A1 | 12/2003 | Mulligan et al. | |
| 2004/0095336 A1 | 5/2004 | Hong et al. | |
| 2005/0275634 A1 | 12/2005 | Chi et al. | |
| 2006/0017709 A1 | 1/2006 | Okano | |
| 2006/0109252 A1 | 5/2006 | Kolmykov-Zotov et al. | |
| 2007/0034159 A1 | 2/2007 | Komino et al. | |
| 2009/0127086 A1 * | 5/2009 | Liu et al. | 200/512 |
| 2010/0006794 A1 | 1/2010 | Hawkins et al. | |
| 2010/0006797 A1 | 1/2010 | Hawkins et al. | |
| 2010/0009255 A1 | 1/2010 | Hawkins et al. | |
| 2010/0068604 A1 | 3/2010 | Hawkins et al. | |
| 2010/0097343 A1 | 4/2010 | Fang | |
| 2010/0118598 A1 | 5/2010 | Hawkins et al. | |
| 2011/0012855 A1 | 1/2011 | Yeh et al. | |
| 2013/0092866 A1 | 4/2013 | Rupert et al. | |
| 2013/0095351 A1 | 4/2013 | Gellett et al. | |
| 2013/0095392 A1 | 4/2013 | Shin et al. | |

FOREIGN PATENT DOCUMENTS

| | | | |
|---|---|---|---|
| CN | 1663124 | | 8/2005 |
| CN | 1797305 | | 7/2006 |
| CN | 101398736 | | 4/2009 |
| CN | 101398736 A | * | 4/2009 |
| CN | 101446872 | | 6/2009 |
| CN | 101751168 | | 6/2010 |
| CN | 101957694 | | 1/2011 |
| CN | 102023742 | | 4/2011 |
| CN | 102023780 | | 4/2011 |
| EP | 0435438 | | 7/1991 |
| EP | 2063349 | | 5/2009 |
| JP | 08110828 | | 4/1996 |
| JP | H0944290 | | 2/1997 |
| TW | 200414057 | | 5/1993 |
| TW | 200923750 | | 5/2010 |
| TW | 201104531 | | 2/2011 |

* cited by examiner

METHOD AND DEVICE FOR DETERMINING IMPEDANCE OF DEPRESSION

CROSS REFERENCE TO RELATED APPLICATIONS

This application is a continuation of U.S. patent application Ser. No. 12/761,930, filed Apr. 6, 2010, which claims the benefit of U.S. Provisional Application No. 61/301,661, filed on Feb. 5, 2010, and Provisional Application No. 61/245,063, filed on Sep. 23, 2009, which are herein incorporated by reference for all intents and purposes.

BACKGROUND OF THE INVENTION

1. Field of the Invention

The present invention relates to a method and device for position detection, and more particularly, to a method and device for depressed position detection.

2. Description of the Prior Art

In U.S. Patent Application Publication No. 2007/0198926, Jouget et al. discloses a device for detecting position, which includes an upper electrode layer and a lower electrode layer. The upper and lower electrode layers include a plurality of conductive stripes arranged in parallel in different directions. The upper and lower electrode layers are separated from each other by insulating spacers interposed therebetween. The conductive stripes of the upper electrode layer are sequentially driven, and while each of the conductive stripes of the upper electrode layer is being driven, all conductive stripes in the lower electrode layer will be sequentially sensed once, thereby all intersecting points intersected by the stripes in the upper and lower electrode layers can be detected. In other words, when a stripe in the upper electrode layer being driven and a stripe in the lower electrode layer being sensed are depressed and made to contact each other, current flows from the driven stripe of the upper electrode layer to the sensed stripe of the lower electrode layer. By sensing signals in the stripes of the lower electrode layer, intersecting points that are depressed can be detected.

As shown in FIG. 1, when a finger depresses a surface, a plurality of intersecting points may be depressed simultaneously. During detection, signals in stripes of the lower electrode layer that are sensed later will be smaller. Thus, a different comparison value has to be used for different intersecting points in order to correctly determine depressions. However, this approach may still be not accurate enough when the number of depressed intersecting points is large. The establishment and storage for the comparison values for each intersecting point are clearly costly and not accurate enough. In addition, when higher resolution is demanded, the density of stripes needs to be increased, and in turn the sensing frequency needs to be lowered.

As can be seen, there are several shortcomings and inconvenience in the prior art requiring solutions that are not yet provided by any current methods and structures. Thus, a new technique is called for to address these long-standing problems.

SUMMARY OF THE INVENTION

In the light of forgoing drawbacks, a first objective of the present invention is to provide a method and device for position detection. The device for position detection may include: a sensor including a plurality of conductive stripes constituting a plurality of intersecting regions, wherein a pair of depressed conductive stripes intersected in an intersecting region form a contact point due to electrical contact so as to define a depressed intersecting region; a driver for providing a high potential and a low potential; a detector for detecting a signal of at least one conductive stripe; a selector for operatively coupling the conductive stripes with the driver and the detector; and a controller for controlling the driver, the detector and the selector to perform at least the following operations: directly or indirectly via an extension resistor respectively providing high and low potentials to a first end and second end of the same conductive stripe; directly or indirectly via an extension resistor respectively providing high and low potentials to a first end of at least a first conductive stripe and a first end of at least one second conductive stripe; detecting the signal between one of the conductive stripes and the extension resistor; and when high and low potentials are provided to one of a pair of depressed conductive stripes, potentials of one or both ends of first and second ends of the other one of the pair of depressed conductive stripes are detected; and when high and low potentials are respectively provided to the first and the second ends of the same conductive stripe via the extension resistor, a non-depressed potential and a depressed potential are determined based on the signal between the conductive stripe and the extension resistor.

The intersecting conductive stripes are spaced apart by a plurality of spacers, when the conductive stripes are not depressed, they are electrically insulated, and when depressed, they form a depressed intersecting region.

In the device for position detection, the method for position detection may include first detecting depressed intersecting regions, and then detecting contact points on the depressed intersecting regions based on the depressed intersecting regions. The detection of the depressed intersecting regions may include first detecting depressed conductive stripes, and then determining potentially depressed intersecting regions based on the depressed conductive stripes, and finally detecting depressed intersecting regions from the potentially depressed intersecting regions.

Through the detection of depressed conductive stripes, the search for depressed intersecting regions can be narrowed. Through the detection of depressed intersecting regions, the search for contact points can be narrowed. Thus, the method and device for position detection of the present invention can speed up the detection of all contact points. The position of each contact point can be expressed by two-dimensional coordinates.

Since the present invention adopts wider conductive stripes, the detection range of these conductive stripes cover a larger range than the prior art, thus rendering a higher resolution.

In addition, the present invention is capable of detecting contact points of multiple different objects and tracing subsequent depressions to determine different gestures.

A second objective of the present invention is to provide a method and device for determining total contact impedance of depressions. Said device for position detection of the present invention further includes: determining each depression on the intersecting regions and total contact impedance for each depression, wherein the total compact impedance for a depression that crosses intersecting regions is the parallel impedance of contact impedances of the plurality of intersecting regions.

Said controller further includes tracing subsequent depressions of each depression based on the total compact impedance of each depression, wherein the differences of total compact impedances of each depression and its each subsequent depression will be within a predetermine range, and the depressed intersecting regions corresponding to the same depression will be neighboring intersecting regions.

Based on total contact impedances, depressions made by a pen, a finger or a palm can be determined.

When total contact impedance is smaller than a threshold value, it is determined that there are multiple depressions on a set of neighboring depressed intersecting regions, otherwise, there is a single depressed intersecting region.

A third objective of the present invention is to provide a method and device for determining contact impedance based on position. In said device for position detection of the present invention, contact impedance is determined based on the potential at the contact point of one and the other of a pair of conductive stripes in a depressed intersecting region or the position of the intersecting region.

In the present invention, the contact impedance can be determined based on the position of contact points or intersecting regions. The prior gives more accurate contact impedance; the latter can determine approximate contact impedance before contact points are known, eliminating the need for detecting the locations of contact points to be omitted, thereby increasing efficiency. In addition, given that the contact point or intersecting region is known, contact impedance can be determined by simply determining the potential at the contact point of the one and the other of the depressed conductive stripes without the need to detect other signals.

The objectives of the present invention can be achieved by the following technical measures. Based on said method and device for determining contact impedance of the present invention, the determination of the contact impedance by the controller includes: determining a first dimensional location and a second dimensional location of the contact point/intersecting region, and determining a first dimensional impedance and a second dimensional impedance based on the first dimensional location and the second dimensional location; when providing high and low potentials to one and the other of a pair of conductive stripes, detecting a first contact potential and a second contact potential of one and the other of the pair of conductive stripes at the contact point/intersecting region; and determining the contact impedance, wherein the contact impedance is (R1+R2)/(((VH−VL)/(P1−P2))−1), wherein R1, R2, VH, VL, P1, and P2 are the first dimensional impedance, the second dimensional impedance, the high potential, the low potential, the first contact potential, and the second contact potential, respectively.

A fourth objective of the present invention is to provide a method and device for position detection with a palm omission function. In said device for position detection of the present invention, the controller further includes determining depressions to be omitted from all depressions, wherein the total contact impedance of a depression to be omitted is smaller than a predetermined threshold value.

The present invention can therefore categorize each depression into depression made by a pen, a finger or a palm based on the total contact impedance, omitting those made by the palm. Thus, there is no need to suspend the palm in the air while writing.

A fifth objective of the present invention is to provide a method and device for correction positional error. In said device for position detection of the present invention, when a conductive stripe has parallel impedance due to a depression that crosses conductive stripes on the same layer, the position of the contact point detected will deviate towards the depression that crosses the conductive stripes on the same layer, causing error. The error correction of the present invention can correct this error and determine the true location of the depression.

The objectives of the present invention can be achieved by the following technical measures. In said device for position detection of the present invention, the determination of contact points of depressed intersecting regions by the controller may include: sequentially selecting one and the other of each pair of the conductive stripes as a driven conductive stripe and a detected conductive stripe, respectively; detecting the potential of the detected conductive stripe as a positional potential when providing the high and low potentials to both ends of the driven conductive stripe; electrically coupling an extension resistor and the driven conductive stripe to form an extension conductive stripe; when the extension conductive stripe is not depressed, providing high and low potential to the extension conductive stripe to detect the potential between the extension resistor and the driven conductive stripe as a non-depressed potential; when the extension conductive stripe is depressed, providing high and low potential to the extension conductive stripe to detect the potential between the extension resistor and the driven conductive stripe as a depressed potential; and determining the position of a contact point on the driven conductive stripe based on the positional potential, the non-depressed and depressed potentials of the driven conductive stripe.

When a depression across conductive stripes is closer to the lower potential, $$Vc = (Vp - VL) - (Vp - VH) \cdot \frac{(VH - VL) \cdot (Vu - Vd)}{(Vu - VL)(VH - Vd)},$$

that is, when the potential difference between the high and low potentials is known, based on the non-depressed potential Vu, the depressed potential Vd, the detected potential Vp, the error in the detected potential Vp can be corrected to create the correct detected potential Vc.

When a depression across conductive stripes is closer to the higher potential, $$Vc = (Vp - VL) - (Vp - VL) \cdot \frac{(VH - VL) \cdot (Vu - Vd)}{(Vu - VL)(VH - Vd)},$$

that is, when the potential difference between the high and low potentials is known, based on the non-depressed potential Vu, the depressed potential Vd, the detected potential Vp, the error in the detected potential Vp can be corrected to create the correct detected potential Vc.

Therefore, the proportion of positional error on the conductive stripe having contact impedance that crosses intersecting regions can be determined based on the change in potential on a position (e.g. a first or second end) on a conductive stripe.

A sixth objective of the present invention is to provide a method and device for detection position misjudgment. In said device for position detection of the present invention, in a situation where three depressions are at three respective vertices of a square region, the detection of depressed intersecting regions may misjudge a fourth vertex as a depressed intersecting region. The present invention may omit or eliminate misjudgment by comparing the positions of contact points or depressed intersecting regions, and may further omit or eliminate the contact point of a misjudged intersecting region.

The objectives of the present invention can be achieved by the following technical measures. In said device for position detection of the present invention, the controller determines the depressions to be eliminated among all depressions. At least one contact point of all contact points corresponding to a depression to be eliminated will fall outside a tolerance range of a corresponding intersecting region.

Said controller further includes determining depressions to be eliminated among all depressions, wherein the depressions to be eliminated will need to meet at least one of the following conditions: the total contact impedance is smaller than a threshold value; and the position of at least one contact point in all contact points corresponding to the same depression falls outside the tolerance range of a corresponding intersecting region; and determining every non-eliminated depression positions among all the depressions, wherein the position of each depression is determined based on the position of the contact point of the depressed intersecting region corresponding to the same depression.

The determination of whether at least one contact point of all contact points corresponding to a depression to be eliminated falls outside a tolerance range of a corresponding intersecting region is performed before the correction of errors in contact points.

A seventh objective of the present invention is to provide a method and device for omitting palms using multiple position detection. The present invention defines an omitted area on a second type of contact/depression detection using a first type of contact/depression detection, wherein the omitted area may include a plurality of independent omitted areas. The first type of detection is used to define depressions made by a palm or depressions with large areas, i.e. areas to be omitted, so when using the second type of position detection, depressions or contacts in the omitted area can be ignored. The first type of detection is a more coarse way of detecting multiple depressions or contacts, and the second type of detection more accurately detects depressions or contacts outside the omitted area, therefore having the advantages of fast detection and high accuracy at the same time.

The first and second types of detection can be realized by the same sensors. For example, the first and second conductive stripes can be spaced apart by a piezoelectric layer, and detecting charge coupling between the first and second conductive stripes can be the first type of detection, while detecting depressed intersecting regions and contact points as described before can be the second type of detection.

The objectives of the present invention can be achieved by the following technical measures. Based on the device for determining impedance of depression of the present invention, the device comprises: a sensor including a plurality of conductive stripes constituting a plurality of intersecting regions, wherein a pair of depressed conductive stripes intersected in an intersecting region form a contact point due to electrical contact so as to define a depressed intersecting region; a driver for providing a high potential and a low potential; a detector for detecting a signal of at least one conductive stripe; a selector for operatively coupling the conductive stripes with the driver and the detector; and a controller for controlling the driver, the detector and the selector to determine a contact impedance, wherein the contact impedance of each depressed intersecting region is determined based on the potentials at the contact point of one and the other of the pair of conductive stripes or the position of the contact point.

The objectives of the present invention can also be achieved by the following technical measures.

The determination of contact impedance comprises: determining a first dimensional location and a second dimensional location of the contact point, and determining a first dimensional impedance and a second dimensional impedance based on the first dimensional location and the second dimensional location; detecting a first contact potential and a second contact potential of one and the other of the pair of conductive stripes when providing high and low potentials to one and the other of the pair of conductive stripes, respectively; and determining the contact impedance according to the first dimensional impedance, the second dimensional impedance, the high potential, the low potential, the first contact potential, and the second contact potential.

The contact impedance is $(R1+R2)/(((VH-VL)/(P1-P2))-1)$, wherein $R1$, $R2$, $VH$, $VL$, $P1$, and $P2$ are the first dimensional impedance, the second dimensional impedance, the high potential, the low potential, the first contact potential, and the second contact potential, respectively.

The determination of the position of the contact point on the depressed intersecting region comprises: sequentially selecting one and the other of the pair of conductive stripes as a driven conductive stripe and a detected conductive stripe, respectively; detecting the potential of the detected conductive stripe as a positional potential when providing high and low potentials to both ends of the driven conductive stripe; and determining the first dimensional location and the second dimensional location based on the detected positional potentials of one and the other of the pair of conductive stripes, respectively.

The determination of the position of the contact point on the depressed intersecting region comprises: sequentially selecting one and the other of the pair of conductive stripes as a driven conductive stripe and a detected conductive stripe, respectively; detecting the potential of the detected conductive stripe as a positional potential when providing high and low potentials to both ends of the driven conductive stripe; electrically coupling an extension resistor and the driven conductive stripe to form an extension conductive stripe; providing high and low potentials to the extension conductive stripe to detect the potential between the extension resistor and the driven conductive stripe as a non-depressed potential when the extension conductive stripe is not depressed; providing high and low potentials to the extension conductive stripe to detect the potential between the extension resistor and the driven conductive stripe as a depressed potential when the extension conductive stripe is depressed; and determining the first dimensional location and the second dimensional location based on the detected positional potentials of one and the other of the pair of conductive stripes, the non-depressed and depressed potentials of the driven conductive stripe.

The controller further controls the driver, the detector and the selector to perform at least the following operations: determining a depression on each depressed intersecting region; and determining a total contact impedance for each depression, wherein the total contact impedance is the parallel impedance of contact impedances of all depressed intersecting regions corresponding to the same depression.

The controller further controls the driver, the detector and the selector to perform at least the following operations: regarding the depression as do not exist when the total contact impedance of the depression is smaller than a threshold value; and determining a depression location of each depression which is not yet regarded as do not exist, wherein the depression location is determined based on the contact points on all depressed intersecting regions corresponding to each depression.

The controller further controls the driver, the detector and the selector to perform at least the following operations: determining the misjudgment of the depressed intersecting region by determining whether the position of the contact point is within a predetermine range of the corresponding intersecting region; determining the misjudgment of the depression based on the misjudgment of the depressed intersecting region if the misjudgment of the depressed intersecting region is determined; and regarding the misjudged depression as do not exist.

The controller further controls the driver, the detector and the selector to perform the following operation of tracing subsequent depressions of each depression based on the total compact impedance of each depression, wherein the differences of total compact impedances of each depression and its each subsequent depression will be within a predetermine range, and the depressed intersecting regions corresponding to the same depression will be neighboring intersecting regions.

The controller further controls the driver, the detector and the selector to perform the following operation that when depressed intersecting regions of a first subsequent depression corresponding to a first depression and of a second subsequent depression corresponding to a second depression are adjacent to each other, these two depressions can be determined to be not made by the same finger based on the total contact impedance of the first depression and the total contact impedance of the second depression.

The objectives of the present invention can be achieved by the following technical measures. Based on the method for determining impedance of depression of the present invention, the method comprises: providing a plurality of intersecting regions constituted by a plurality of intersecting conductive stripes, wherein a pair of depressed conductive stripes intersected in an intersecting region form a contact point due to electrical contact so as to define a depressed intersecting region; and determining a contact impedance, wherein the contact impedance of each depressed intersecting region is determined based on the potentials at the contact point of one and the other of the pair of conductive stripes or the position of the contact point.

The objectives of the present invention can also be achieved by the following technical measures.

The determination of contact impedance comprises: determining a first dimensional location and a second dimensional location of the contact point, and determining a first dimensional impedance and a second dimensional impedance based on the first dimensional location and the second dimensional location; detecting a first contact potential and a second contact potential of one and the other of the pair of conductive stripes when providing high and low potentials to one and the other of the pair of conductive stripes, respectively; and determining the contact impedance according to the first dimensional impedance, the second dimensional impedance, the high potential, the low potential, the first contact potential, and the second contact potential.

The contact impedance is $(R1+R2)/(((VH-VL)/(P1-P2))-1)$, wherein $R1$, $R2$, $VH$, $VL$, $P1$, and $P2$ are the first dimensional impedance, the second dimensional impedance, the high potential, the low potential, the first contact potential, and the second contact potential, respectively.

The determination of the position of the contact point on the depressed intersecting region comprises: sequentially selecting one and the other of the pair of conductive stripes as a driven conductive stripe and a detected conductive stripe, respectively; detecting the potential of the detected conductive stripe as a positional potential when providing high and low potentials to both ends of the driven conductive stripe; and determining the first dimensional location and the second dimensional location based on the detected positional potentials of one and the other of the pair of conductive stripes, respectively.

The determination of the position of the contact point on the depressed intersecting region comprises: sequentially selecting one and the other of the pair of conductive stripes as a driven conductive stripe and a detected conductive stripe, respectively; detecting the potential of the detected conductive stripe as a positional potential when providing high and low potentials to both ends of the driven conductive stripe; electrically coupling an extension resistor and the driven conductive stripe to form an extension conductive stripe; providing high and low potentials to the extension conductive stripe to detect the potential between the extension resistor and the driven conductive stripe as a non-depressed potential when the extension conductive stripe is not depressed; providing high and low potentials to the extension conductive stripe to detect the potential between the extension resistor and the driven conductive stripe as a depressed potential when the extension conductive stripe is depressed; and determining the first dimensional location and the second dimensional location based on the detected positional potentials of one and the other of the pair of conductive stripes, the non-depressed and depressed potentials of the driven conductive stripe.

The method for determining impedance of depression further comprises: determining a depression on each depressed intersecting region; and determining a total contact impedance for each depression, wherein the total contact impedance is the parallel impedance of contact impedances of all depressed intersecting regions corresponding to the same depression.

The method for determining impedance of depression further comprises: regarding the depression as do not exist when the total contact impedance of the depression is smaller than a threshold value; and determining a depression location of each depression which is not yet regarded as do not exist, wherein the depression location is determined based on the contact points on all depressed intersecting regions corresponding to each depression.

The method for determining impedance of depression further comprises: determining the misjudgment of the depressed intersecting region by determining whether the position of the contact point is within a predetermine range of the corresponding intersecting region; determining the misjudgment of the depression based on the misjudgment of the depressed intersecting region if the misjudgment of the depressed intersecting region is determined; and regarding the misjudged depression as do not exist.

The method for determining impedance of depression further comprises: tracing subsequent depressions of each depression based on the total compact impedance of each depression, wherein the differences of total compact impedances of each depression and its each subsequent depression will be within a predetermine range, and the depressed intersecting regions corresponding to the same depression will be neighboring intersecting regions.

The method for determining impedance of depression further comprises: when depressed intersecting regions of a first subsequent depression corresponding to a first depression and of a second subsequent depression corresponding to a second depression are adjacent to each other, these two depressions can be determined to be not made by the same finger based on the total contact impedance of the first depression and the total contact impedance of the second depression.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
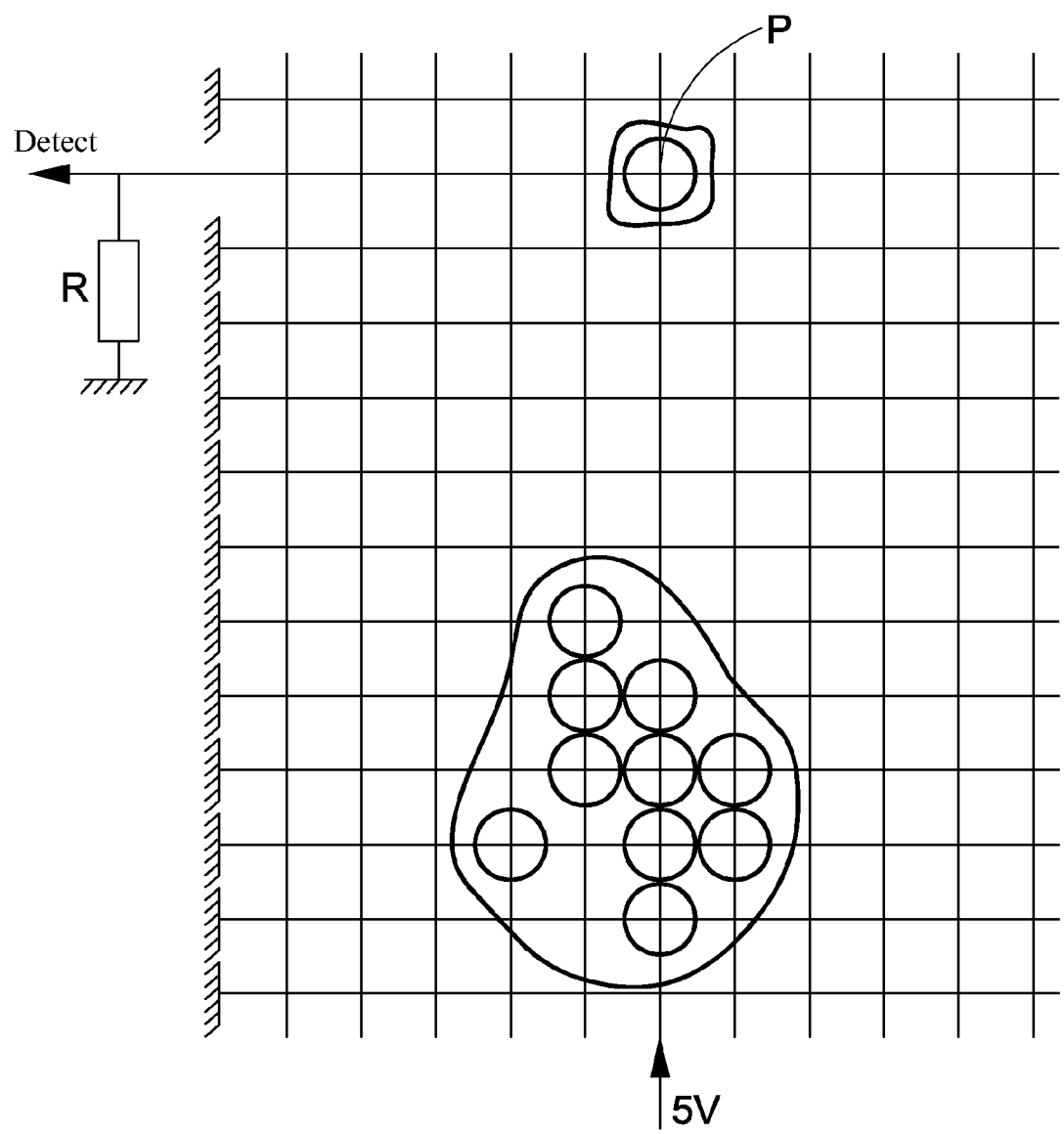
FIG. 1 is a schematic diagram depicting a prior-art device for position detection.

The present disclosure can be described by the embodiments given below. It is understood, however, that the embodiments below are not necessarily limitations to the present disclosure, but are used to a typical implementation of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

The present invention is described by the following specific embodiments. Those with ordinary skills in the arts can readily understand the other advantages and functions of the present invention after reading the disclosure of this specification. In order to provide clear illustration and understanding, some parts of the diagrams may not be drawn to scale, some are exaggerated with respect to others, and some are omitted.

Figure 2A:
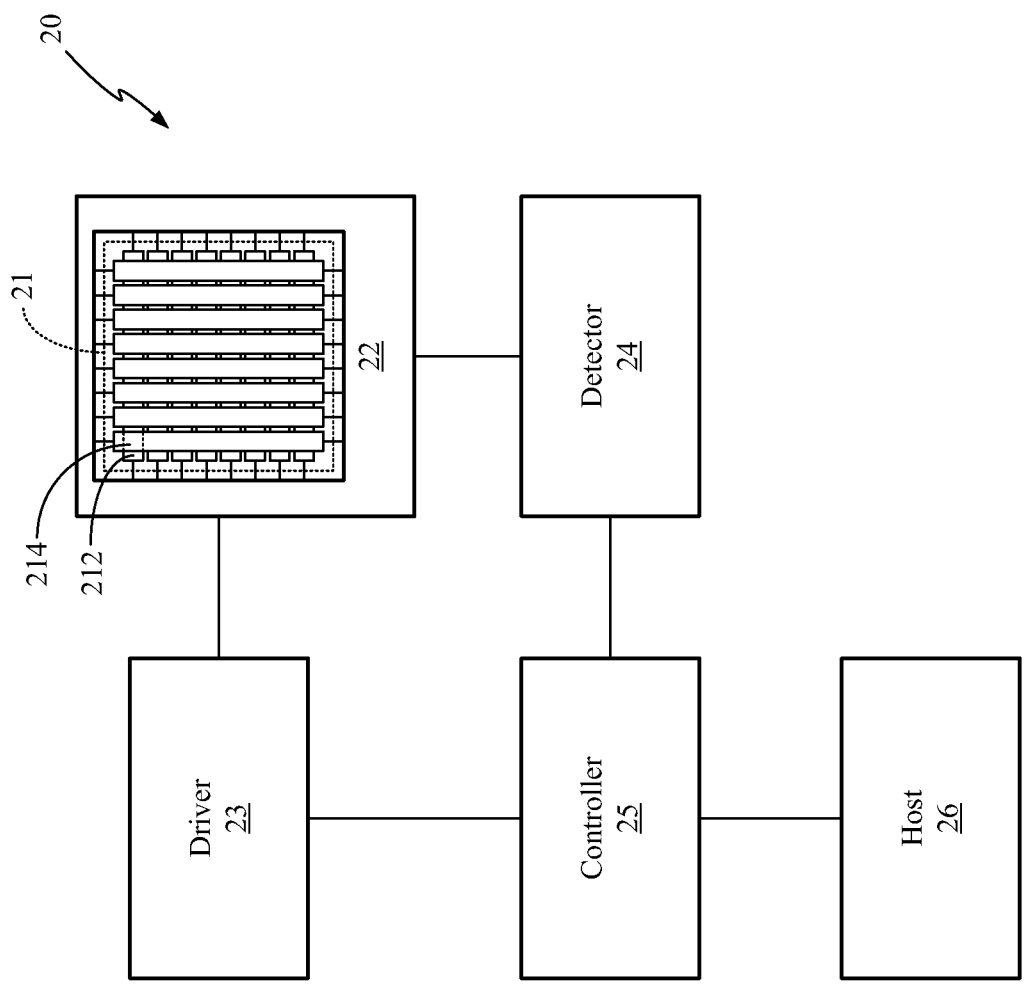
FIG. 2A is a schematic diagram depicting the structure of a device for position detection of the present invention.

Referring to FIG. 2A, the present invention provides a device for position detection 20, which includes a sensor 21, a selector 22, a driver 23, a detector 24, a controller 25 and a host 26.

Figure 2B:
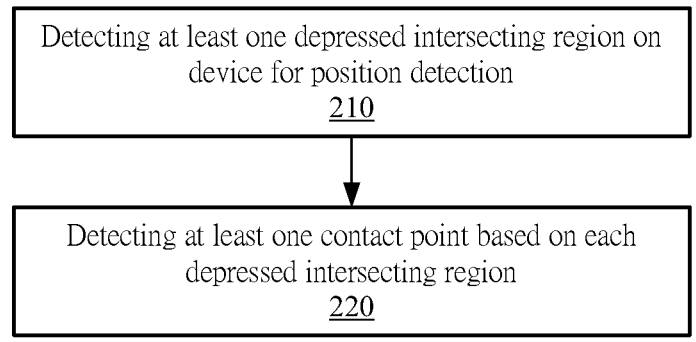
FIG. 2B is a flowchart illustrating a method for position detection of the present invention.

Referring to FIG. 2B, the present invention provides a method for position detection. First, as shown in step 210, at least one depressed intersecting region on the device for position detection 20 is detected. Next, as shown in step 220, at least one contact point is detected based on each depressed intersecting region.

The sensor 21 includes a plurality of conductive stripes 212. These stripes include a plurality of first and second stripes intersecting on a plurality of intersecting regions 214. When an object depresses the device 20, some of the first and second stripes contact one another to form at least one contact point corresponding to the depression made by the object, wherein the conductive stripes intersecting an intersecting region are a pair of depressed conductive stripes.

The first and second stripes do not contact each other while not being depressed. In one example of the present invention, a plurality of insulating spacers are dispersed between the first and second stripes to separate them. In addition, the present invention does not limit the positions of the first and second conductive stripes, the first stripes can be on top or the second stripes on top. In one example of the present invention, the first and second stripes are arranged in different axes, so that the plurality of intersecting regions constitutes an intersecting matrix. For example, the first conductive stripes are arranged in the horizontal direction, and the second conductive stripes are arranged in the vertical direction, or vice versa. The first and second conductive stripes are disposed at different layers.

The first and second stripes can each have predetermined widths, thus intersecting regions are formed at intersections of the first and second stripes. It should be apparent to those skilled in the art that the widths of each stripe can be different, so the intersecting regions can also be different. The present invention is not limited thereto.

In addition, it should be apparent to those skilled in the art that, based on different objects, the number and area of the intersecting regions in which the first and second stripes contact each other can be different. In a preferred example of the present invention, the contact point on each intersecting region is singular, that is, no matter what the size of the depressed area on an intersecting region is, the depressed area on this intersecting region is regarded as a single contact point. It should be apparent to those skilled in the art that when the intersecting region is larger, there can be two or more contact points. In this circumstance, two different contact points can be identified based on the order of depression in time. The number of the contact points in a single intersecting region in the present invention includes but is not limited to one.

Controller 25 electrically couples with and controls selector 22, driver 23, and detector 24. Selector 22 operatively couples driver 23 and detector 24 to sensor 21 based on instructions from controller 25. In an example of the present invention, driver 23 and detector 24 operatively couple with sensor 21 via selector 22 based on instructions from controller 25. For example, selector 22 selects one or two ends of at least one conductive stripe based on instructions from controller 25, and uses the selected one or two ends of the stripe as coupling ends to electrically couple one or both of driver 23 and detector 24.

In an example of the present invention, the coupling end is directly coupled to driver 23 or detector 24 via selector 22. In another example of the present invention, the coupling end is indirectly coupled to driver 23 or detector 24 via selector 22 in combination with an extension resistor. For example, the extension resistor electrically couples with the selected conductive stripe to form an extension stripe, and the extension resistor electrically couples with driver 23 and detector 24, that is, the coupling end electrically couples with driver 23 and detector 24 via the extension resistor.

In an example of the present invention, driver 23 provides a high potential and a low potential at two coupling ends. The high and/or low potentials can be provided to two coupling ends directly or indirectly via an extension resistor. The two coupling ends can be on the same or different conductive stripes. For example, a first end of a first conductive stripe and a second end of a second conductive stripe.

In another example of the present invention, detector 24 detects signals at the coupling ends. The detected signals can be potential, current, capacitance, charge transfer or other electrical signals. A coupling end operatively coupled by detector 24 can be abovementioned first end or a second end corresponding to the first end on the conductive stripe. For example, the first end can be the coupling end of the conductive stripe coupled to the extension resistor.

Accordingly, control of selector 22, driver 23, and detector 24 by controller 25 includes but is not limited to: directly or indirectly via an extension resistor providing high and low potentials to first and second ends of the same conductive stripe, respectively; directly or indirectly via an extension resistor providing high and low potentials to a first end of at least one first stripe and a second end of at least one second stripe, respectively; detecting a signal between the stripe and the extension resistor; when one of a pair of depressed stripes being provided with high and low potentials, detecting potentials at one or two ends of another one of the pair of depressed stripes; and detecting potentials at the second ends of one of those first stripes and one of those second stripes, respectively.

In an example of the present invention, controller 25 can be integrated into host 26, including but not limited to a processor, co-processor, digital signal processor (DSP) or other programmable circuits of host 26. In another example of the present invention, controller 25 is not part of host 26.

Controller 25 determines each depression based on signals detected by detector 24, wherein an object may cause one or more depressions, for example, when a palm depresses, it may cause an area or several independent depressions. In addition, controller 25 may ignore (or eliminate or filter) some depressions based on the signals detected by detector 24. For example, ignoring palm depression during handwriting, or ignoring non-existing depressions caused by misjudgment. Additionally, controller 25 further provides locations of depressions to host 26.

The present invention further includes tracking of depressions subsequent to each depression and determining at least one gesture based on each depression and its subsequent depressions, and determining a command corresponding to the gesture. The gesture can be determined by controller 25 or host 26. When controller 25 is not integrated as part of host 26, controller 25 can provide the locations of the depressions and host 26 can perform said depression omission and gesture determination. Alternatively, controller 25 can perform said depression omission and then provide the locations of the depressions to host 26 for gesture determination. Alternatively, controller 25 can perform said depression omission and gesture determination, and provide one or both of depression locations or gestures. When controller 25 is integrated into host 26, depression omission and gesture determination can be processed by controller 25 or host 26.

Figure 3:
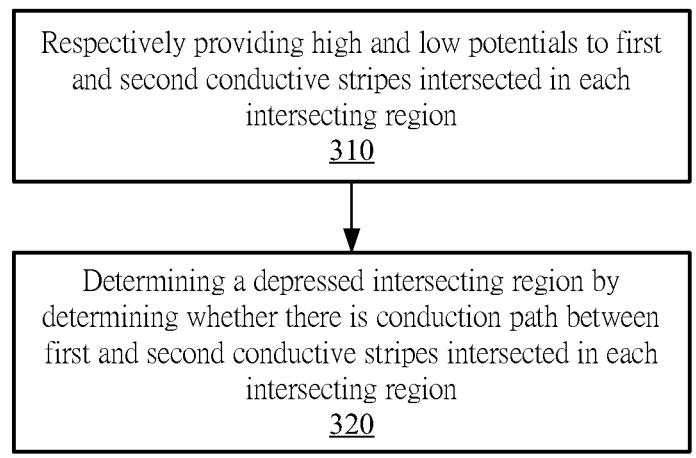
FIG. 3 is a flowchart illustrating driving and detecting of depressed intersecting regions of the present invention.

FIG. 3 illustrates a method for detecting depressed intersecting regions according to the present invention. As shown in step 310, high and low potentials are respectively provided to first and second conductive stripes intersected in each intersecting region, and as shown in step 320, each depressed intersecting region is determined by determining whether there is a conducting path between the first and second conductive stripes in each intersecting region.

For example, a high potential is sequentially provided to the first conductive stripes. When each first conductive stripe is at high potential, a low potential is sequentially provided to each of the second conductive stripes. In this way, each of the intersecting regions on the first conductive stripe being driven can be sequentially determined to see if it is depressed.

Figure 4A:
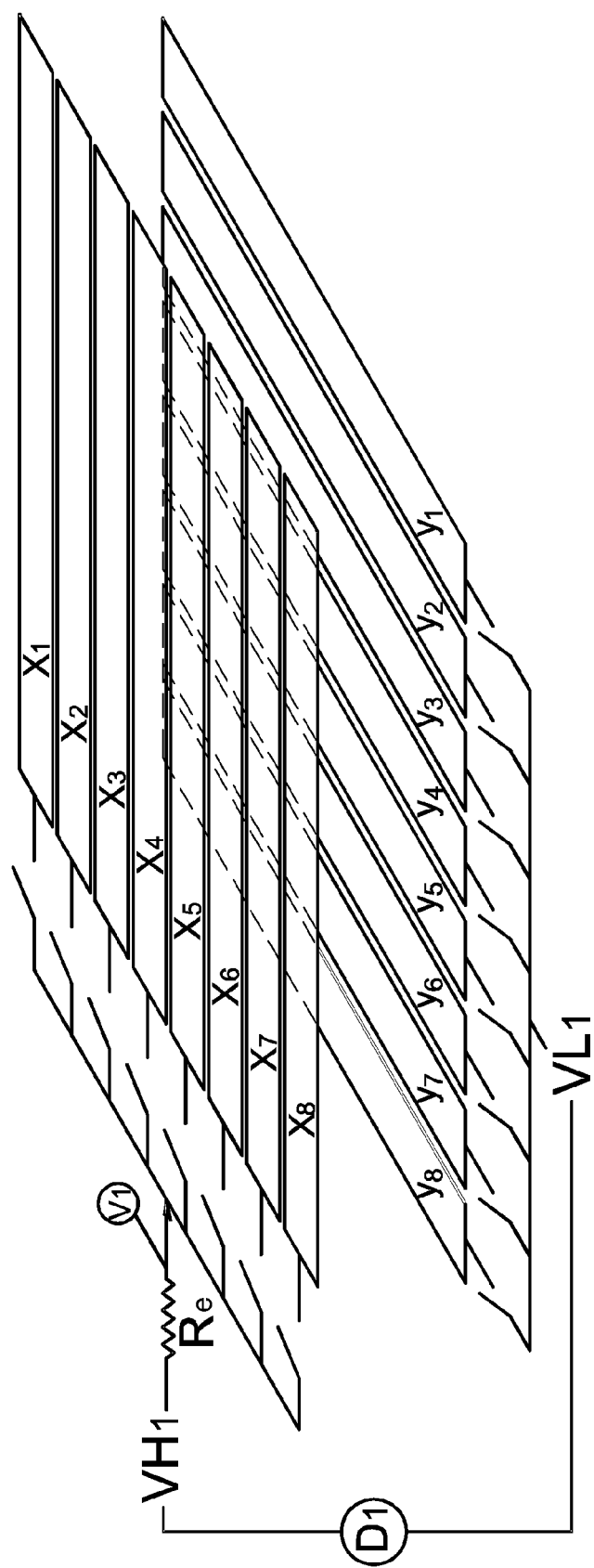
FIGS. 4A, 4B, and 4C are schematic diagrams depicting the structure of a device for position detection of the present invention detecting depressed intersecting regions.

Accordingly, in a preferred embodiment of the present invention, a device for position detection detecting depressed intersecting regions is shown in FIG. 4A, which includes a detecting unit V1 and a driving unit D1. The detecting unit provides high potential VH1 and low potential VL1, wherein high potential VH1 is provided to one of first conductive stripes (X1, X2, . . . , X8), whereas low potential VL1 is provided to one of second conductive stripes (Y1, Y2, . . . , Y8). The detecting unit V1 detects conductive stripes provided with high potential VH1. The numbers of the first stripes (X1, X2, . . . , X8) and second stripes (Y1, Y2, . . . , Y8) are given for illustration purpose only, the present invention is not limited to these.

The detection of the first conductive stripes provided with high potential VH1 includes but is not limited to detection of potential, current or logic level, and the detection can be done at one or both ends of the first conductive stripes provided with high potential VH1. For example, in an example of the present invention, high potential VH1 can be provided to one of the first stripes (X1, X2, . . . , X8) via an extension resistor Re, and depressed intersecting regions can be determined by detecting the potential, current or logic level at one end of the extension resistor Re (between the extension resistor Re and the conductive stripe).

Figure 4B:
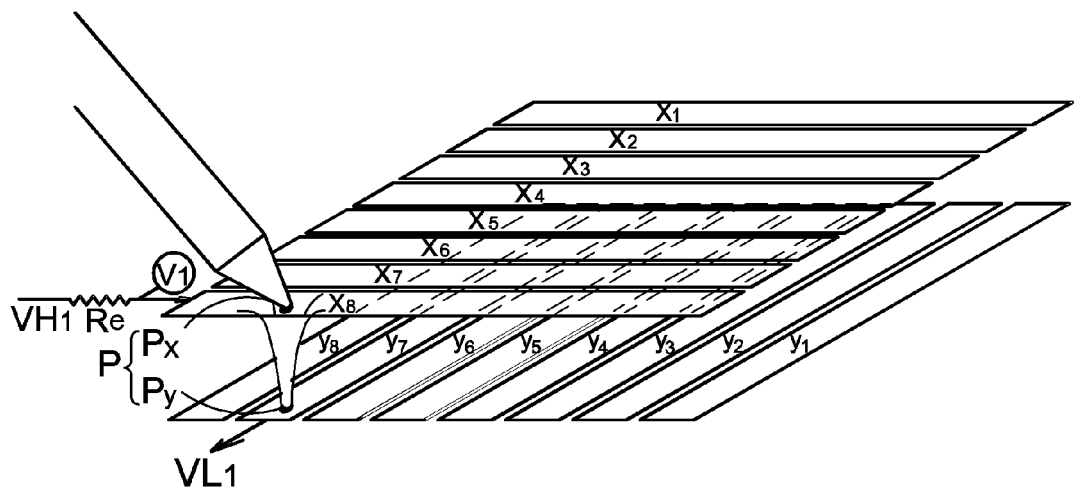
Figure 4C:
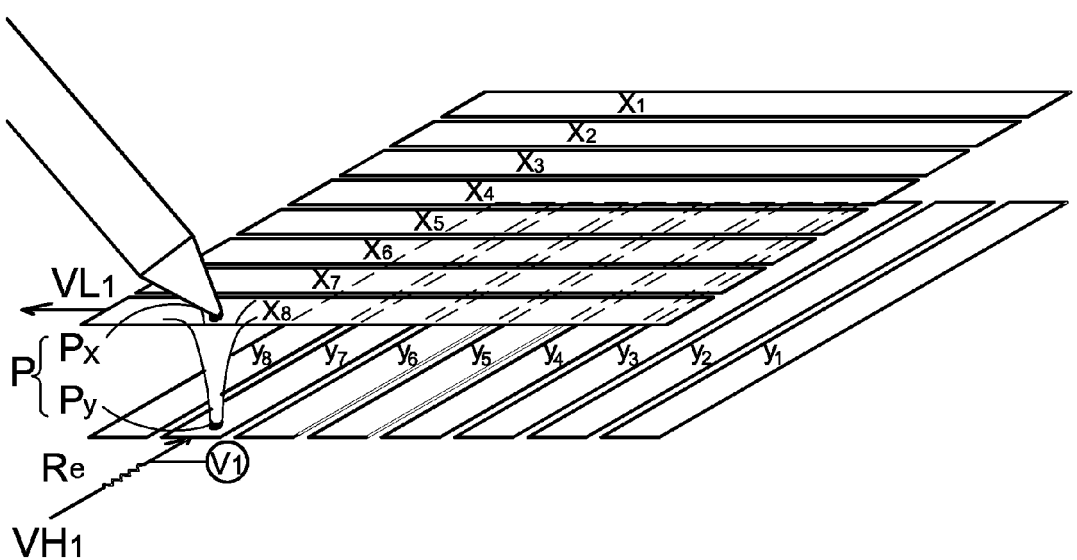

For example, when high potential VH1 and low potential VL1 are provided to conductive stripes X1 and Y1, respectively, the detecting unit V1 can determine if an intersecting region intersected by stripes X1 and Y1 is depressed. For example, when detecting the intersecting region intersected by stripes X1 and Y1, the driving unit D1 provides high potential VH1 and low potential VL1 to conductive stripes X1 and Y1, respectively, and if the intersecting region intersected by stripes X1 and Y1 is not depressed as shown in FIG. 4B, current will not flow from stripe X1 to stripe Y1, thus no significant change in the signal of the extension resistor Re is observed, and the detecting unit V1 may then determine that the intersecting region intersected by stripes X1 and Y1 is not depressed. Similarly, when detecting the intersecting region intersected by stripes X8 and Y7, the driving unit D1 provides high potential VH1 and low potential VL1 to conductive stripes X8 and Y7, respectively, current will flow from stripe X8 to stripe Y7, and the detecting unit V1 may then determine that the intersecting region intersected by stripes X8 and Y7 is depressed by detecting a change in the potential of the extension resistor Re. It should be apparent to those skilled in the art that low potential VL1 can be provided to one of the first stripes (X1, X2, ..., X8) and high potential VH1 can be provided to one of the second stripes (Y1, Y2, ..., Y8), as shown in FIG. 4C. Said driving unit D1 and detecting unit V1 include but are not limited to being integrated in said driver 23 and detector 24, respectively, and the driving of driving unit D1 and detection of detecting unit V1 include but are not limited to control by controller 25. Control of selector 22, driver 23, and detector 24 by controller 25 includes but is not limited to: indirectly providing high and low potentials to a first end of at least one first conductive stripe and a first end of at least one second conductive stripe; and detecting the signal between the stripe and the extension resistor.

Figure 5:
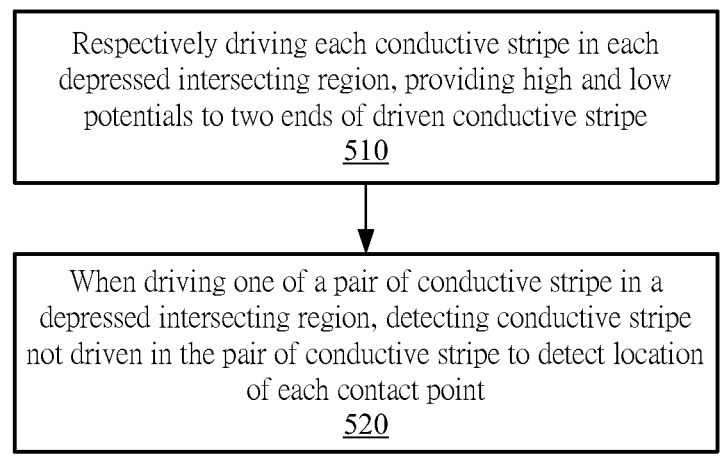
FIG. 5 is a flowchart illustrating a method for detecting contact points of the present invention.

FIG. 5 is a flowchart depicting steps for detecting at least one contact point based on each depressed intersecting region. As shown in step 510, each of conductive stripes intersecting each depressed intersecting region is respectively driven, the two ends of the driven stripe are provided with a high potential and a low potential, respectively. As shown in step 520, when one of a pair of conductive stripes in a depressed intersecting region is driven, the other stripe not driven is detected so as to determine the location of each contact point. For the detection of the stripe not driven, one or both ends of the stripe not driven can be detected simultaneously.

In other words, in each depressed intersecting region, one of a pair of conductive stripes in the depressed intersecting region is driven, and the other stripe in the pair not driven is detected to determine the two-dimensional coordinates for a contact point. For example, the first conductive stripe in the pair of stripes is first driven and the second conductive stripe is detected to detect the location of the contact point on the axis of the first conductive stripe as a first coordinate Px in the two-dimensional coordinates. Then, the second conductive stripe in this pair of stripes is driven and the first conductive stripe is detected to detect the location of the contact point on the axis of the second conductive stripe as a second coordinate Py in the two-dimensional coordinates. The order of driving the first and second conductive stripes is not limited to this. After both first and second conductive stripes are detected, the position of the contact point on the axes of the first and second conductive stripes can be determined. This position can be indicated by the two-dimensional coordinates (Px, Py).

Figure 6A:
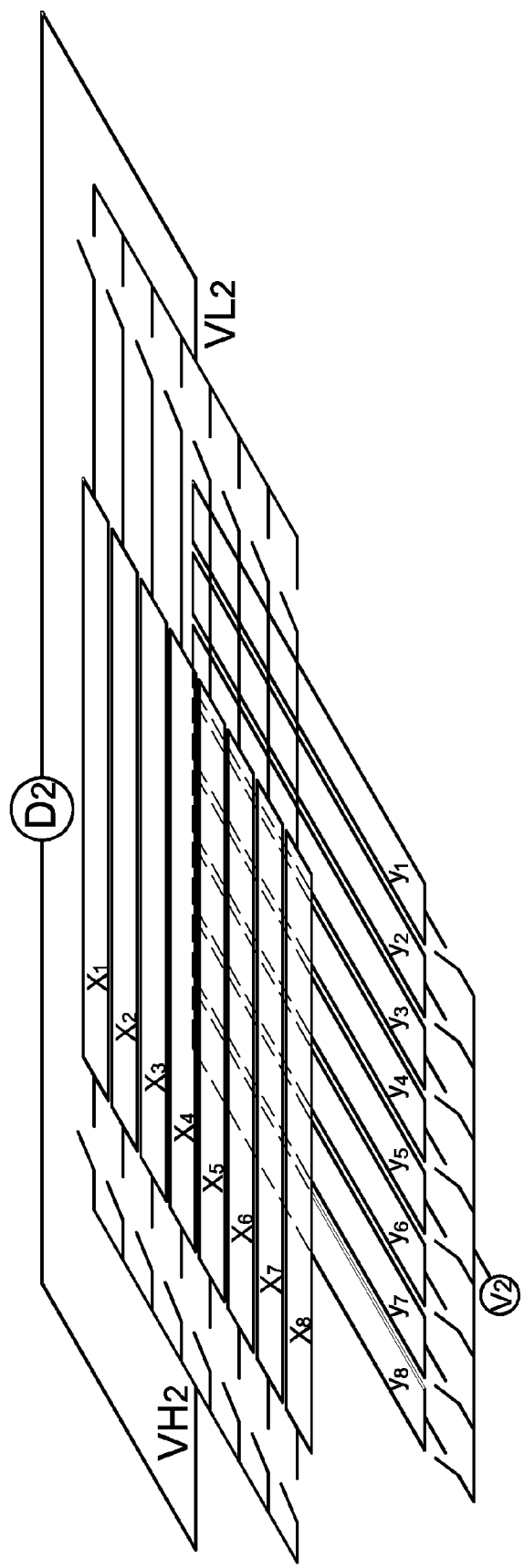
FIGS. 6A, 6B, and 6C are schematic diagrams depicting the structure of a device for position detection of the present invention detecting contact points.

In a preferred example of the present invention, a device for position detection 20 detecting contact points is shown in FIG. 6A. The device for position detection includes a plurality of conductive stripes, a detecting unit V2 and a driving unit D2. The plurality of conductive stripes are said first conductive stripes (X1, X2, ..., X8) and second conductive stripes (Y1, Y2, ..., Y8). The driving unit provides high potential VH2 and low potential VL2 to drive one of the conductive stripes, and detecting unit V2 detects one of conductive stripes intersecting the driven stripe. Thus, when a driven stripe intersects a detected stripe in a depressed intersecting region, detecting unit V2 can determine the position of a contact point P on the driven conductive stripe.

Figure 6B:
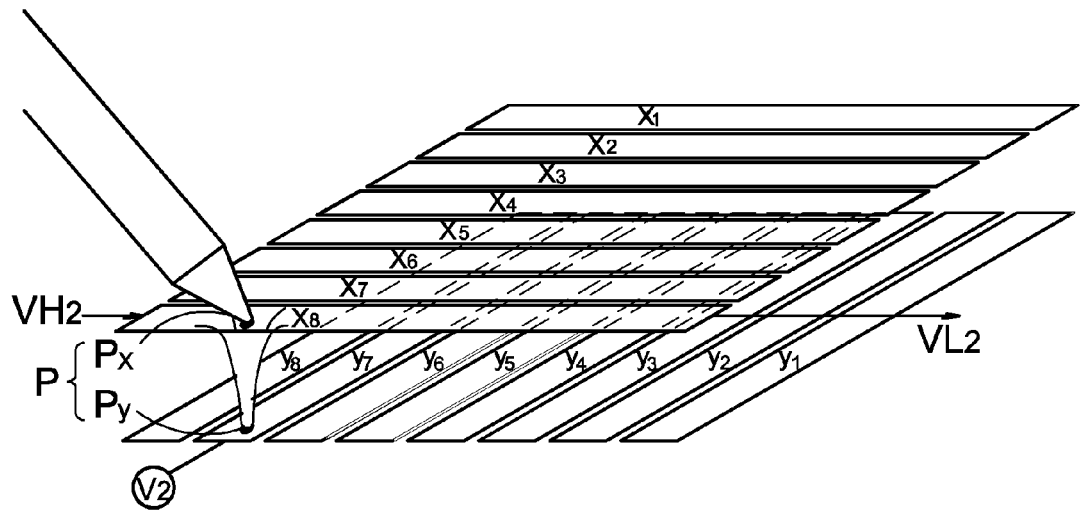
Figure 6C:
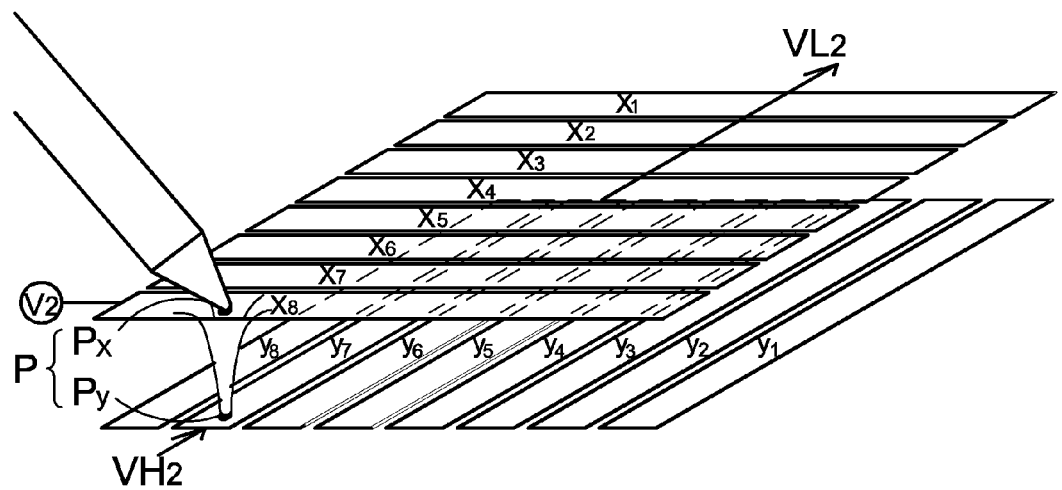

For example, when a depressed intersecting region is an intersecting region between conductive stripes X8 and Y7 as shown in FIG. 6B, the driving unit first provides high potential VH2 and low potential VL2 to both ends of stripe X8, and detects stripe Y7 to determine the location Px of the contact point P on stripe X8 (axis of the first conductive stripe). Similarly, as shown in FIG. 6C, the driving unit then provides high potential VH2 and low potential VL2 to both ends of stripe Y7, and detects stripe X8 to determine the location Py of the contact point P on stripe Y7 (axis of the second conductive stripe). Driving unit D2 and detecting unit V2 include but are not limited to being integrated into said driver 23 and detector 24, respectively, and the driving of driving unit D1 and detection of detecting unit V1 include but are not limited to control by controller 25. Control of selector 22, driver 23, and detector 24 by controller 25 includes but is not limited to: directly or indirectly via an extension resistor providing high and low potentials to first and second ends of the same conductive stripe; and when one of a pair of depressed conductive stripes is provided with high and low potentials, potential at one or both ends of the other one in the pair are detected.

In an example of the present invention, driving unit D2 and detecting unit V2 sequentially detects each intersecting region to detect all depressed intersecting regions, and driving unit D2 and detecting unit V2 sequentially detects each intersecting region to determine a 2-D image of the first conductive stripe axis and a 2-D image of the second conductive stripe axis in each intersecting region, and then determines the position of each contact point based on the 2-D images of the first and second conductive stripe axes in each depressed intersecting region. Obviously, compared to selecting depressed intersecting regions and then determining the position of each contact point for the depressed intersecting regions mentioned above, this example is less efficient.

In the above description, the detection of detecting unit V1 includes but is not limited to detection of potential, current or logic level, whereas the detection of detecting unit V2 is the actual value of signals, such as voltage value or current value, and each intersecting region requires detection in two dimensions, thus the detection of depressed intersecting regions is much quicker than the detection of contact points.

The numbers of the first stripes (X1, X2, ..., X8) and second stripes (Y1, Y2, ..., Y8) are given for illustration purpose only, the present invention is not limited to these, and they can be modified according to design needs. Thus, when the numbers of the first and second conductive stripes are m and n, respectively, there will be m*n intersecting regions to be detected. The more the number of the first and second conductive stripes, the longer the detection will take. Thus, the speed of detecting all intersecting regions has to be increased to enhance the overall performance.

Figure 7:
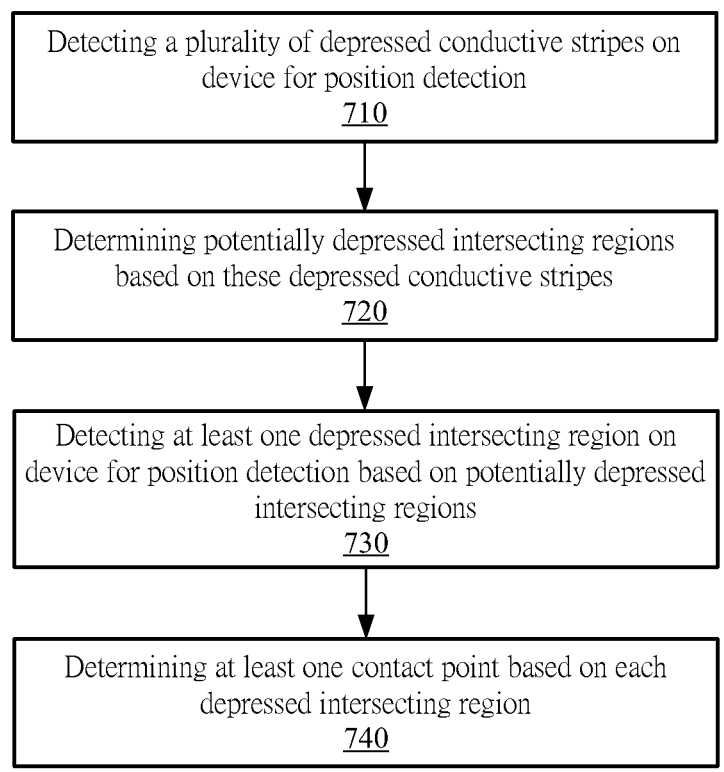
FIG. 7 is a flowchart illustrating a method for detecting depressed conductive stripes of the present invention.

Accordingly, an example of the present invention is shown in FIG. 7. As shown in step 710, a plurality of depressed conductive stripes on a device for position detection is detected. Then, as shown in step 720, potentially depressed intersecting regions on which depressed conductive stripes intersect are determined based on the depressed conductive stripes. Then, as shown in step 730, at least one depressed intersecting region on the device for position detection is detected based on the potentially depressed intersecting regions. Further, as shown in step 740, at least one contact point is determined based on each depressed intersecting region.

In other words, it is first determined which first and second conductive stripes are depressed, and potential depressed intersecting regions are determined based on the those depressed first and second conductive stripes. Compared to FIGS. 3, 4A, and 4C which detect depressed intersecting regions out of all intersecting regions, the present example detects depressed intersecting regions out of potentially depressed intersecting regions.

Figure 8A:
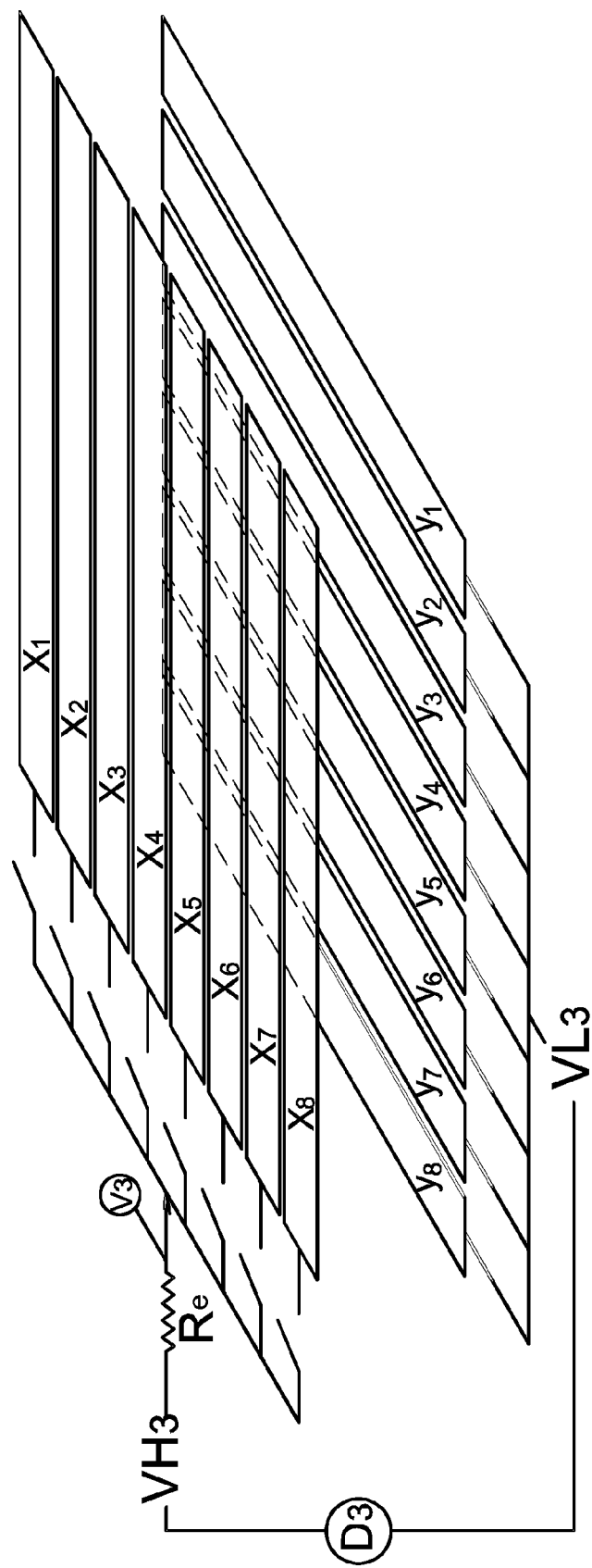
FIGS. 8A, 8B, and 8C are schematic diagrams depicting the structure of a device for position detection of the present invention detecting depressed conductive stripes.

In a preferred example of the present invention, a device for position detection detecting depressed conductive stripes is shown in FIG. 8A. The device for position detection includes a plurality of conductive stripes, detecting unit V3 and driving unit D3. The conductive stripes are said first conductive stripes (X1, X2, ..., X8) and second conductive stripes (Y1, Y2, ..., Y8). Driving unit D3 provides high potential VH3 to one of these conductive stripes, and provides low potential VL3 to all the conductive stripes intersecting with the conductive stripe provided with high potential VH3 to respectively detect depressed conductive stripes.

Figure 8B:
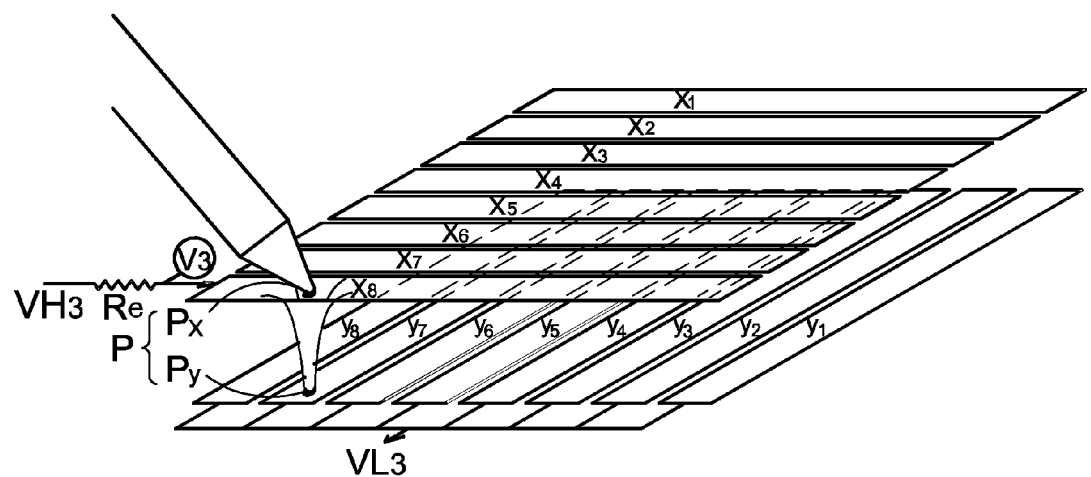
Figure 8C:
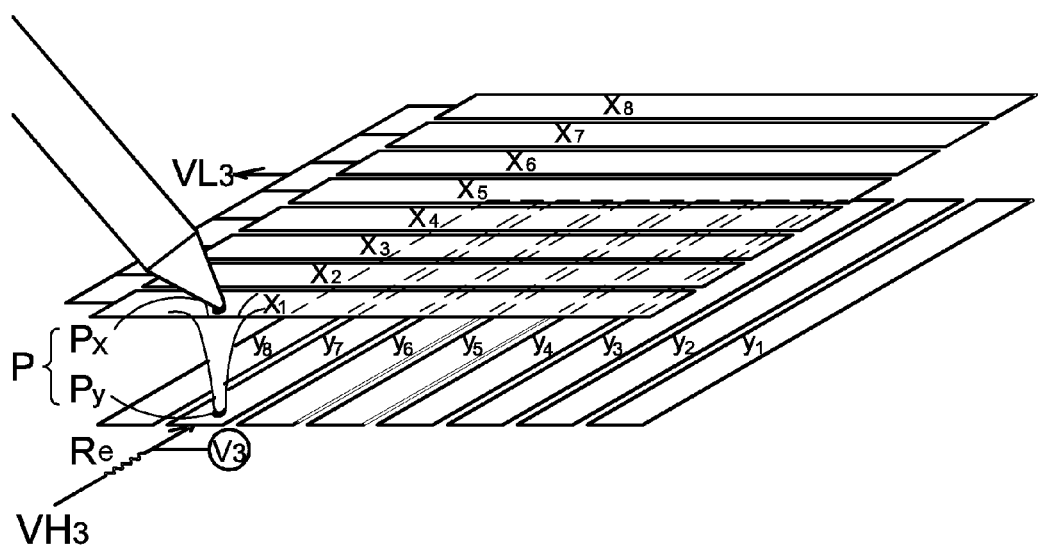

For example, as shown in FIG. 8B, driving unit D3 provides high potential VH3 to one of the first conductive stripes (X1, X2, ..., X8), and provides low potential VL3 to all the second conductive stripes (Y1, Y2, ..., Y8) intersecting with the conductive stripe provided with high potential VH3. Detecting unit V3 detects first detecting stripe provided with high potential VH3. For example, first conductive stripes X1, X2, ..., or X7 are not depressed, so current does not flow from detected first conductive stripes X1, X2, ..., or X7 to any second conductive stripe, so detecting unit V3 does not detect that first conductive stripes X1, X2, ..., or X7 are depressed. When first conductive stripe X8 is provided with high potential VH3, current flow from first conductive stripe X8 to second conductive stripe Y7, so detecting unit V3 detects that first conductive stripe X8 is depressed.

Similarly, driving unit D3 provides high potential VH3 to one of the second conductive stripes (Y1, Y2, ..., Y8), and provides low potential VL3 to all the first conductive stripes (X1, X2, ..., X8) intersecting with the second conductive stripe provided with high potential VH3. Detecting unit V3 thereby detects depressed a second conductive stripe, such as second conductive stripe Y7.

The detection of the conductive stripes provided with high potential VH3 is similar to said detection of the first conductive stripes provided with high potential VH1, including but not limited to detection of potential, current or logic level, and the detection can be done at one or both ends of the first conductive stripes provided with high potential VH3. For example, in an example of the present invention, high potential VH3 can be provided to one of the stripes via an extension resistor Re, and depressed conductive stripes can be determined by detecting the potential, current or logic level at one end of the extension resistor Re (between the extension resistor Re and the conductive stripe).

Thus, at least one potential depressed intersecting region in which depressed conductive stripes intersect can be determined by the depressed conductive stripes (e.g. conductive stripes X8 and Y7). When the number of potential depressed intersecting regions is not more than three, the potential depressed intersecting regions are the depressed intersecting regions.

In addition, driving unit D3 can simultaneously provide high potential VH3 to a plurality of conductive stripes, and detecting unit V3 can simultaneously detect some or all conductive stripes provided with high potential VH3, however, the conductive stripes provided with high potential VH3 all have to be first conductive stripes or second conductive stripes.

The conductive stripes are selectively chosen to be driven or detected. It should be apparent to those skilled in the art that the implementation of selection of the conductive stripes may include but not limited to a switching device such as a switch, a multiplexer or a bus; the present invention does not limited to these. In addition, said high potentials VH1, VH2, and VH3 can be the same or different; similarly, said low potentials VL1, VL2, and VL3 can be the same or different; the present invention does not limited to these. Moreover, said extension resistor can be the same or different; the present invention does not limited to these.

Said driving unit D3 and detecting unit V3 include but are not limited to being integrated in said driver 23 and detector 24, respectively, and the driving of driving unit D1 and detection of detecting unit V1 include but are not limited to control by controller 25. Control of selector 22, driver 23, and detector 24 by controller 25 includes but is not limited to: indirectly providing high and low potentials to a first end of at least one first conductive stripe and a first end of at least one second conductive stripe; and detecting the signal between the stripe and the extension resistor.

Figure 9:
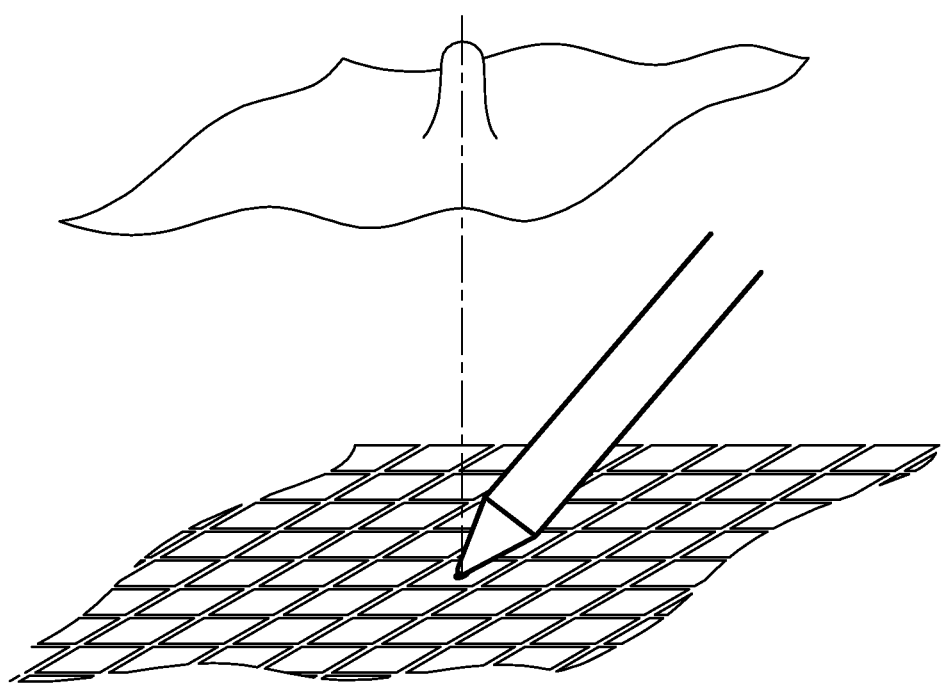
FIG. 9 is a schematic diagram depicting an image of an intersecting region depressed by the end of a pen.
Figure 10A:
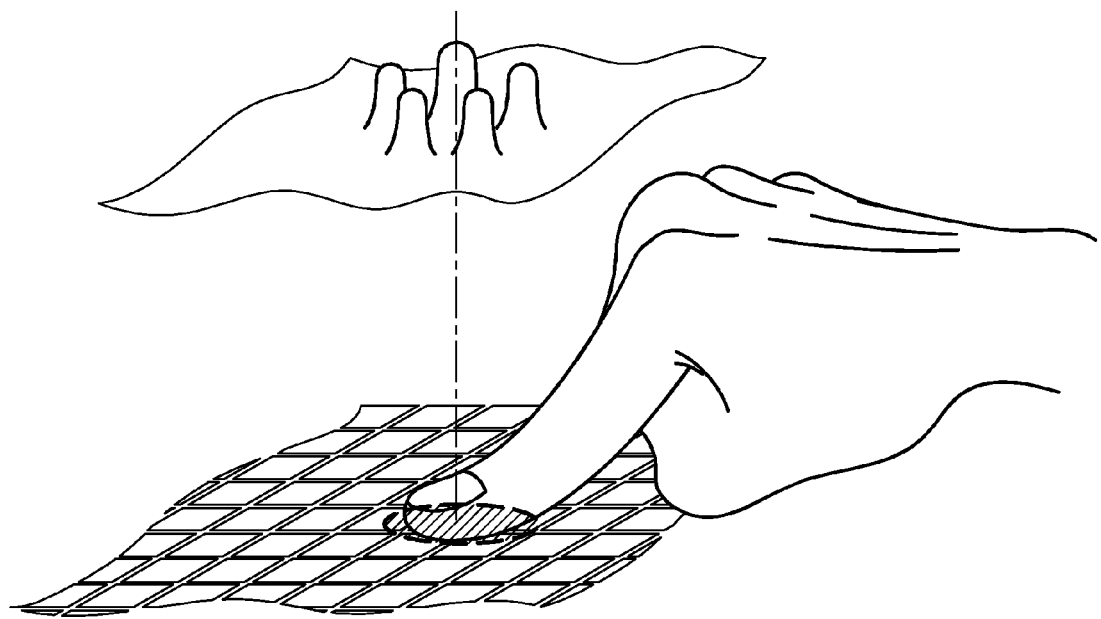
FIGS. 10A and 10B are schematic diagrams depicting an image of intersecting regions depressed by one and two fingers.

According to the above, all contact points after detection may exhibit an image of intersecting region as shown in FIG. 9. If an object has a sharp end, the depression of this object will produce a corresponding signal of contact point on the image of intersecting region. When a finger or an object with a blunt end depresses, the image of intersecting region may exhibit several corresponding signals of contact points, as shown in FIG. 10A.

Figure 10B:
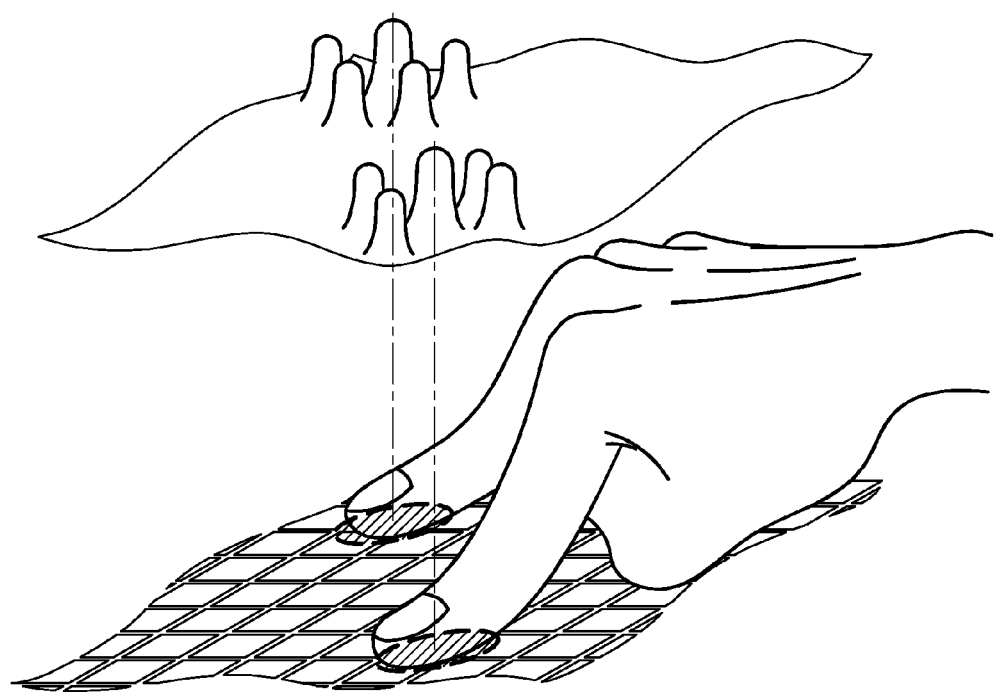

Contact points corresponding to the same object will gather together, as shown in FIG. 10B, thus contact points corresponding to each depressing object can be analyzed and identified. In an example of the present invention, the time each contact point is generated can be used to analyze contact points corresponding to each depressing object.

By analysis of the image of intersecting regions, the shape of the object can be determined by the number of contact points for the depressing object. For example, it can be determined whether the object is a pen or a finger based on how many contact points there are corresponding to the object. In addition, the pressure exerted by a depressing object can be simulated based on the number of contact points for the depressing object.

Moreover, based on difference comparisons of the images of intersecting regions at consecutive time points, trajectory of a moving object can be outlined for determining a gesture. For example, a gesture can be determined by trajectories made by a pair of depressing objects. The trajectories of the objects may include: moving away from each other, one moving away from the other, moving towards each other, one moving towards the other, rotating around each other, and one rotating around the other.

In an example of the present invention, it can be determined whether an object is a pen or a finger based on how many contact points there are corresponding to the object. In addition, the pressure exerted by a depressing object can be simulated based on the number or spreading range of contact points for the depressing object. When there are more than one contact points corresponding to an object, the center of mass of the contact points corresponding to the object can be regarded as the depression location of the object.

Accordingly, an example of the present invention is a device for position detection, which includes a plurality of conductive stripes, a first and a second driving unit, and a first and a second detecting unit. The conductive stripes include a plurality of first and second conductive stripes intersecting each other to form a plurality of intersecting regions. When at least one object depresses the device, the first and second conductive stripes contact each other to form at least one contact point corresponding to the depressing object.

The first driving unit and the first detecting unit can be driving unit D1 and detecting unit V1 described in steps 310 and 320 in FIG. 3 and FIGS. 4A to 4C. When the first driving unit respectively provides a high potential and a low potential to a first and a second conductive stripe intersecting each intersecting region, the second detecting unit detects the first conductive stripe provided with the high potential to detect each depressed intersecting region.

The second driving unit and the second detecting unit can be driving unit D2 and detecting unit V2 described in steps 510 and 520 in FIG. 5 and FIGS. 6A to 6C. The second driving unit respectively drives each conductive stripe intersecting in each depressed intersecting region. When one of a pair of conductive stripes intersecting in a depressed intersecting region is driven by the second driving unit, the second detecting unit detects the other conductive stripe in the pair not driven by the second driving unit to detect the position of each contact point, wherein the second driving unit provides high and low potentials to the driven conductive stripe.

Relevant details of the present example have been disclosed previously and will not be repeated herein.

In addition, another example of the present invention is a device for position detection, which includes a plurality of conductive stripes, a first, a second, and a third driving unit, and a first, a second, and a third detecting unit. The conductive stripes include a plurality of first and second conductive stripes intersecting each other to form a plurality of intersecting regions. When at least one object depresses the device, the first and second conductive stripes contact each other to form at least one contact point corresponding to the depressing object.

The first driving unit and the first detecting unit can be driving unit D3 and detecting unit V3 described in steps 710 to 740 in FIG. 7 and FIGS. 8A to 8C. The first driving unit selectively provides a high potential to conductive stripes, and the first detecting unit detects the conductive stripes provided with the high potential by the first driving unit, so as to detect a plurality of depressed conductive stripes. Each intersecting region in which the depressed conductive stripes intersect is a potentially depressed intersecting region. When the conductive stripe provided with the high potential by the first driving unit is a first conductive stripe, the first driving unit provides a low potential to all second conductive stripes, and when the conductive stripe provided with the high potential by the first driving unit is a second conductive stripe, the first driving unit provides a low potential to all first conductive stripes.

The second driving unit and the second detecting unit can be driving unit D1 and detecting unit V1 described in steps 310 and 320 in FIG. 3 and FIGS. 4A to 4C. When the second driving unit respectively and selectively provides high and low potentials to first and second conductive stripes in each potentially depressed intersecting region, the second detecting unit detects the first conductive stripe provided with the high potential to detect each depressed intersecting region.

The third driving unit and the third detecting unit can be driving unit D2 and detecting unit V2 described in steps 510 and 520 in FIG. 5 and FIGS. 6A to 6C. The third detecting unit respectively drives the conductive stripes in each depressed intersecting region. When one of a pair of conductive stripes in a depressed intersecting region is driven by the third driving unit, the third detecting unit detects the other conductive stripe in the pair not driven by the third driving unit, so as to detect the position of each contact point, wherein the third driving unit provides high and low potentials to the driven conductive stripe.

Relevant details of the present example have been disclosed previously and will not be repeated herein.

Compared to the prior art, the driving and detecting methods of the present invention will not cause signals of contact points detected at later times to become weaker due to too many contact points detected earlier, so there is no need to provided different determining standards for different detection regions. In addition, the present invention not only detects which regions have been depressed, but also determines the position of contact points in the intersecting regions, that is, the present invention achieves higher resolution with fewer conductive stripes.

In addition, the present invention further includes palm omitting function during handwriting. Under the handwriting mode, depressions made by the end of a pen and the palm can be distinguished, and the trajectory of the pen can be traced. Accordingly, an example of the present invention is a device for position detection, which includes a plurality of conductive stripes, a first, a second, a third, and a fourth driving unit, and a first, a second, and a third detecting unit, and a fourth and a fifth detecting unit. The conductive stripes include a plurality of first and second conductive stripes intersecting each other to form a plurality of intersecting regions. When at least one object depresses the device, the first and second conductive stripes contact each other to form at least one contact point corresponding to the depressing object. Based on the descriptions above, when at least one object depresses the device, each depressed intersecting region and contact points in each depressed intersecting region can be detected.

In an example of the present invention, a method and a device for determining contact impedance based on locations of contact points is provided, wherein the contact impedance of each contact point is determined after each contact point is detected. The fourth driving unit and the fourth and fifth detecting units are respectively driving unit D4 providing high potential VH4 and low potential VL4 and detecting units V4 and V5 shown in FIG. 11A. The fourth driving unit selectively and respectively provides high potential VH4 and low potential VL4 to each depressed intersecting region, and detecting units V4 and V5 respectively detects the potentials of conductive stripes provided with high potential VH4 and low potential VL4 at the contact point. For example, when high potential VH4 is provided to one end of a first conductive stripe in a depressed intersecting region, detecting unit V4 detects a first potential P1 at the other end of the first conductive stripe, and when low potential VL4 is provided to one end of a second conductive stripe in the depressed intersecting region, detecting unit V5 detects a second potential P2 at the other end of the second conductive stripe. Since on conductive stripes where materials are uniformly distributed, the impedance is approximately proportional to the position. Accordingly, the impedances R1 and R2 can be deduced from the position of the contact point on the first and second conductive stripes. According to high potential VH4, low potential VL4, first and second potentials P1 and P2 and impedances R1 and R2, impedance R between the two conductive stripes at the contact point can be calculated.

According to an example of the present invention, a process for determining contact impedance is provided. This process can be performed by said controller, including but not limited to determining the contact impedance for each depressed intersecting region. The contact impedance is determined by the potentials of one and the other of a pair of conductive stripes in the depressed intersecting region at the contact point and the position of the contact point.

The above determination of contact impedance may include: determining a first dimensional location and a second dimensional location of the contact point, and determining a first dimensional impedance and a second dimensional impedance based on the first dimensional location and the second dimensional location; detecting a first contact potential and a second contact potential of one and the other of a pair of conductive stripes when a high potential and a low potential is provided to one and the other of a pair of conductive stripes, respectively; determining the contact impedance based on the first dimensional impedance, the second dimensional impedance, the high potential, the low potential, the first contact potential, and the second contact potential.

Said driving unit D4 and detecting units V4 and V5 include but are not limited to being integrated in said driver 23 and detector 24, respectively, and the driving of driving unit D4 and detection of detecting units V4 and V5 include but are not limited to control by controller 25. Control of selector 22, driver 23, and detector 24 by controller 25 includes but is not limited to: directly or indirectly via an extension resistor respectively providing high and low potentials to a first end of at least one first conductive stripe and a first end of at least one second conductive stripe; and respectively detecting the potentials at the second ends of one of the first conductive stripes and one of the second conductive stripes.

In another example of the present invention, a method and device for determining contact impedances based on locations of intersecting regions is provided. Impedances R1 and R2 can be deduced based on the location of the depressed intersecting region, as shown in FIG. 11B. For example, impedances R1 and R2 can be deduced based on the number of intersecting regions between a depressed intersecting region on the first and second conductive stripes and the ends with high and low potentials. For example, when there are m intersecting regions between the depressed intersecting region and one end provided with high potential VH4, the impedance R1 is m units, or m+1 units (including the depressed intersecting region). Similarly, when there are n intersecting regions between the depressed intersecting region and one end provided with high potential VH4, the impedance R1 is n units or n+1 units. Thus, detection of impedances R1 and R2 can be performed after determining the depressed intersecting region and before detecting the contact point.

According to an example of the present invention, the method and device for determining contact impedance based on locations of intersecting regions includes a process for determining contact impedances. This process can be performed by said controller, including but not limited to determining the contact impedance for each depressed intersecting region. The contact impedance is determined by the potentials of one and the other of a pair of conductive stripes in the depressed intersecting region at the contact point and the position of the depressed intersecting region.

The above determination of contact impedance may include: determining a first dimensional impedance and a second dimensional impedance based on the location of the depressed intersecting region; detecting a first contact potential and a second contact potential of one and the other of a pair of conductive stripes when a high potential and a low potential is provided to one and the other of a pair of conductive stripes, respectively; determining the contact impedance based on the first dimensional impedance, the second dimensional impedance, the high potential, the low potential, the first contact potential, and the second contact potential.

From the above, formula 1 can be derived as: $(P1-P2)/(VH4-VL4)=R/(R1+R+R2)$, and formula 2 can be derived from this as $R=(R1+R2)/(((VH4-VL4)/(P1-P2))-1)$. That is, contact impedance R at the contact point between the first and second conductive stripes is calculated from high potential VH4, low potential VL4, first and second potentials P1 and P2 (e.g. the first contact potential and the second contact potential) and impedances R1 and R2 (e.g. the first dimensional impedance and the second dimensional impedance). In other words, the contact impedance at the contact point between the first and second conductive stripes can be determined based on the location of the depressed intersecting region or the location of the contact point, potential differences provided between depressed conductive stripes, potential differences detected at the contact point of the first and second conductive stripes.

Figure 11A:
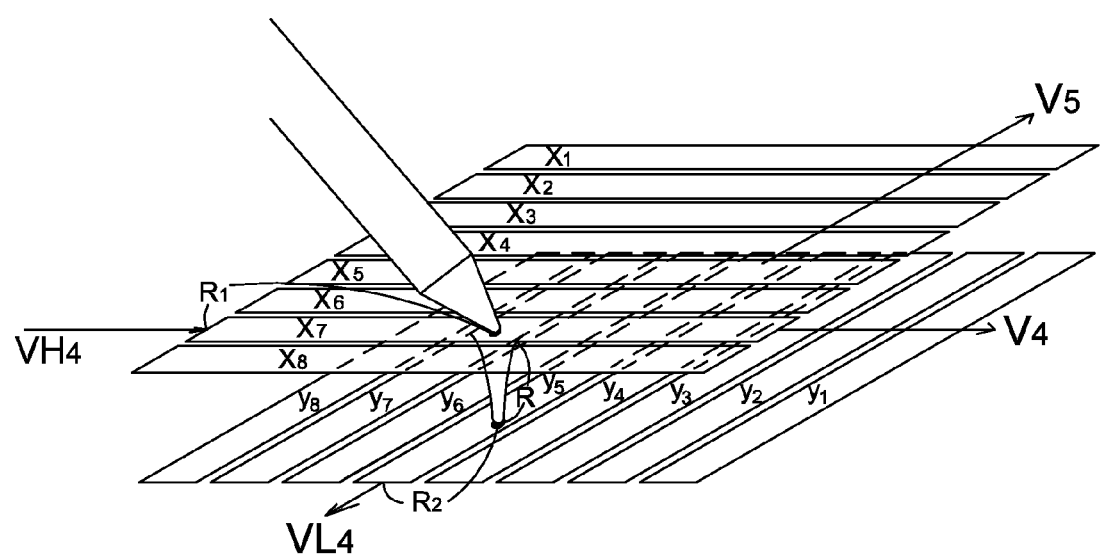
FIGS. 11A and 11B are schematic diagrams depicting the structure of a device for detecting compact impedance of the present invention.
Figure 11B:
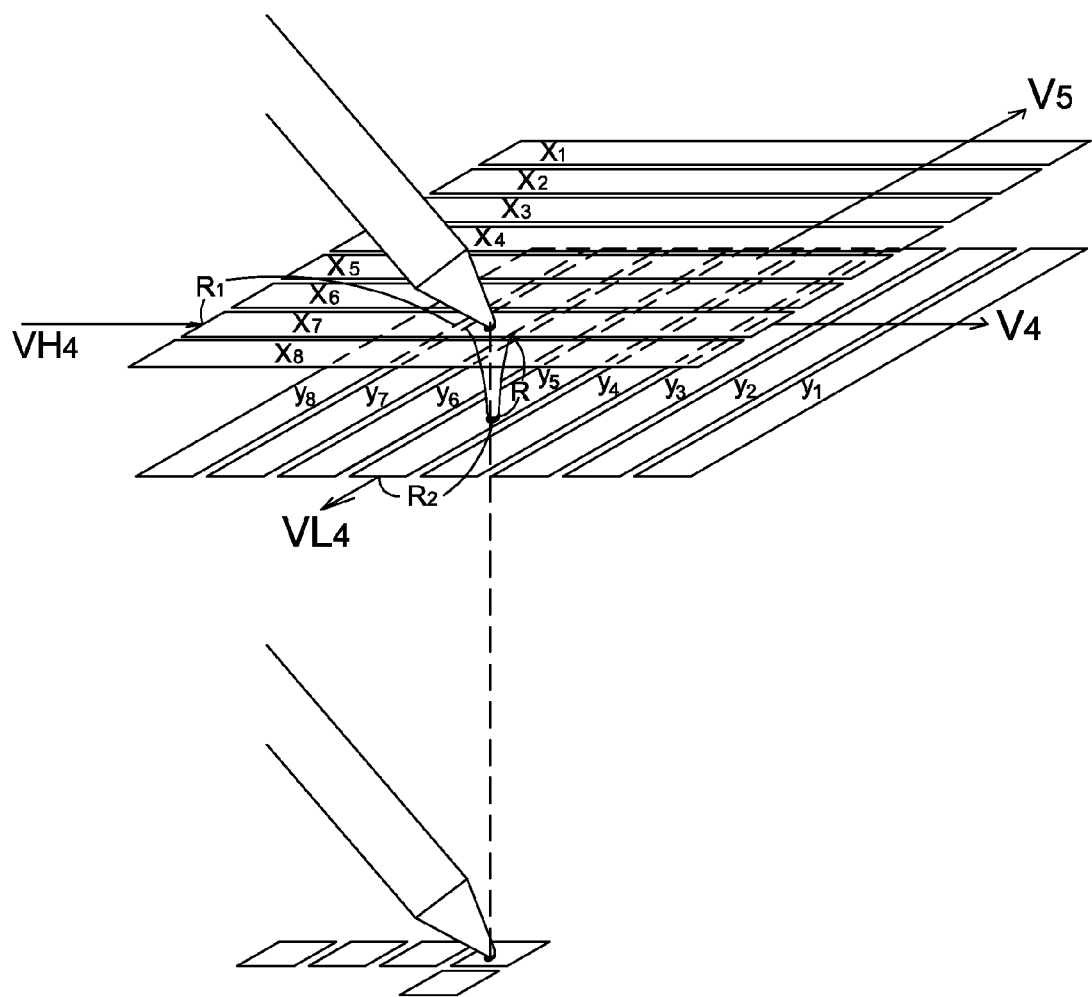

In addition, as shown in FIGS. 11A and 11B, the above detection of each depressed intersecting region can be done based on first potential P1 detected by fourth detecting unit V4 and second potential P2 detected by fifth detecting unit V5. For example, when first potential P1 is not high potential VH4 or second potential P2 is not low potential VL4, it can be determined that the intersecting region provided with the high and low potentials is a depressed intersecting region. For example, when the potential difference between first potential P1 and second potential P2 is not the potential difference between the high and low potentials, it can be determined that the intersecting region provided with the high and low potentials is a depressed intersecting region. It should be apparent to those skilled in the art that the determination of whether first potential P1 is high potential VH4 and the determination of whether second potential P2 is low potential VL4 are performed within a tolerance range.

Thus, as shown in FIG. 11B, when driving unit D4 is used to provide high potential VH4 and low potential VL4 to each intersecting region, depressed intersecting regions and contact impedances R between the first and second conductive stripes in the depressed intersecting regions can be identified. In other words, the detection of depressed intersecting regions can be performed based on one or both of a first potential and a second potential (e.g. determine if there is a conduction path between the first and second conductive stripes), and the contact impedances at the contact points between the first and second conductive stripes in the depressed intersecting regions can be determined at the same time as the detection of the depressed intersecting regions.

Similar to those shown in FIGS. 3 to 4C and 7 to 8C, the method for determining depressed intersecting regions described in FIG. 11A or 11B can include first determining depressed conductive stripes, then determining potentially depressed intersecting regions based on the depressed conductive stripes, and then determining depressed intersecting regions based on the potentially depressed intersecting regions. In an example of the present invention, one of high potential VH4 and low potential VL4 is operatively coupled to a conductive stripe, and the other one of high potential VH4 and low potential VL4 is operatively coupled to a plurality of conductive stripe to determine depressed conductive stripes.

For example, high potential VH4 is sequentially and operatively coupled to every first conductive stripe. When any first conductive stripe is operatively coupled, low potential VL4 is simultaneously coupled to all second conductive stripes. The first conductive stripe is determined to be depressed if there is a conduction path between the first conductive stripe and the second conductive stripe. For example, an operatively-coupled first conductive stripe is determined to be depressed if first potential P1 detected by detecting unit V4 is equal to or approximate high potential VH4. Similarly, high potential VH4 is coupled to all first conductive stripes, and low potential VL4 is sequentially and operatively coupled to every second conductive stripe. The second conductive stripe is determined to be depressed if there is a conduction path between the first conductive stripe and the second conductive stripe. Next, potentially depressed intersecting regions are determined based on all the depressed conductive stripes. For example, intersecting regions in which the depressed first conductive stripes and the depressed second conductive stripes intersected are regarded as the potentially depressed intersecting regions. Next, each depressed intersecting region is identified based on the determination of said potentially depressed intersecting regions, and the contact impedance on each depressed intersecting region is also determined at the same time. In this example, each depressed intersecting region can be determined without an extension resistor, the contact point and the contact impedance of each depressed intersecting region can also be determined, wherein the determination of the impedance can be done before the determination of the contact point.

Figure 11C:
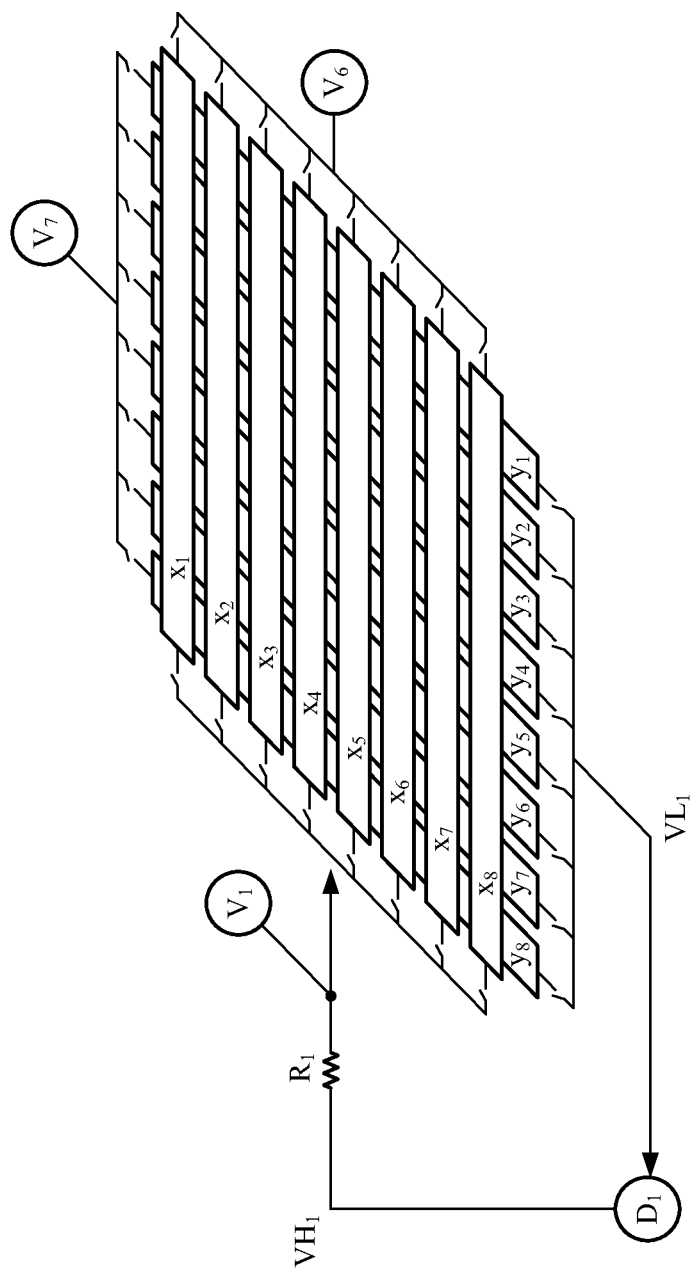
FIG. 11C is a schematic diagrams depicting the structure of another device for detecting compact impedance of the present invention.

Further, in an example of the present invention, a device for position detection detecting depressed intersecting regions is shown in FIG. 11C, the device includes detecting units V1, V6, and V7 and a driving unit D1. Driving unit D1 provides high potential VH1 and low potential VL1, wherein high potential VH1 is provided to one of first conductive stripes (X1, X2, ..., X8), while low potential VL1 is provided to one of second conductive stripes (Y1, Y2, ..., Y8). Detecting unit V1 detects the conductive stripe that is provided with high potential VH1.

As described earlier, the detection of the first conductive stripes provided with high potential VH1 includes but is not limited to the detection of potential, current or logic level. For example, in an example of the present invention, high potential VH1 can be provided to one of the first conductive stripes (X1, X2, ..., X8) via an extension resistor Re, and depressed intersecting regions can be determined by detecting the potential, current or logic level at one end of the extension resistor Re (between the extension resistor Re and the conductive stripe). High potential VH1 and low potential VL1 are respectively provided on a first end of the first and second conductive stripes.

By determining a depressed intersecting region using potential P3 detected by detecting unit V1, the second ends of the first conductive stripe and the second conductive stripe intersected in the depressed intersecting region are further respectively detected using detecting units V6 and V7, wherein detecting units V1, V6, and V7 detects first potential P1, second potential P2, and third potential P3, respectively. Based on the impedance of extension resistor Re, first potential P1, second potential P2, and third potential P3, contact impedance R between the first and second conductive stripes in the depressed intersecting region can be determined. Thus, since the current in a series circuit is equal, (VH1−P3)/R1= (P1−P2)/R, and R=R1 (P1−P2)/(VH1−P3).

As shown in FIG. 11C, when driving unit D1 provides high potential VH1 and low potential VL1 to each intersecting region, depressed intersecting regions can be determined, so as impedance R between the first and second conductive stripes in each depressed intersecting region.

Said driving unit D1 and detecting units V1, V6, and V7 include but are not limited to being integrated in said driver 23 and detector 24, respectively, and the driving of driving unit D4 and detection of detecting units V4 and V5 include but are not limited to control by controller 25. Control of selector 22, driver 23, and detector 24 by controller 25 includes but is not limited to: directly or indirectly via an extension resistor providing high and low potentials to a first end of at least one first conductive stripe and a first end of at least one second conductive stripe, respectively; detecting the signal between the stripe and the extension resistor; and detecting the potentials at the second ends of one of the first conductive stripes and one of the second conductive stripes, respectively. Depression of a single object may simultaneously depress several neighboring intersecting regions, as shown in FIG. 12C. Thus, the distances between the contact points in the neighboring intersecting regions can be used to determine whether they are caused by the same object. For example, if the distance between the contact points in two neighboring intersecting regions on the same axis does not exceed the width of one intersecting region, these contact points are regarded as caused by the depression of the same object. Similarly, if the distance between the contact points in two intersecting regions at diagonal positions does not exceed the diagonal width of one intersecting region, these contact points are regarded as caused by the depression of the same object. The present invention includes but not is not limited these.

In addition, contact impedances R between the first and second conductive stripes in neighboring intersecting regions depressed by the same object are regarded as contact impedances connected in parallel and as the total contact impedance of the depression from the same object. For example, two neighboring intersecting regions are depressed by the same object, the contact impedances at the contact points between the first and second conductive stripes in the two neighboring intersecting regions are Ra and Rb, respectively, and the total contact impedance of the depression is 1(RaRb/Ra+Rb). Accordingly, depression trajectory of an object can be traced by the parallel contact impedances of the neighboring intersecting regions. For example, when a finger depresses the device, the difference between the total contact impedances of a depressed single intersecting region and multiple neighboring depressed intersecting regions is not significant, thus it can be used to determine whether neighboring depressed intersecting regions are depressed by the same finger. For example, when two fingers are closer to each other, respective depressions can be distinguished by previous impedance values of the depressions made by the two fingers.

For example, when depressed intersecting regions of a first subsequent depression corresponding to a first depression and of a second subsequent depression corresponding to a second depression are adjacent to each other, these two depressions can be determined to be not made by the same finger based on the total contact impedance of the first depression and that of the second depression. For example, the determination can be done based on the direction of movement of the first and second subsequent depressions and the total contact impedances, or using a dividing algorithm based on the contact impedance of each depressed intersecting region. For example, the determination can be done using a dividing algorithm based on weights generated from the contact impedance of each contact point, wherein the weight is inversely proportional to the contact impedance. It should be apparent to those skilled in the art that there are other ways of determining different depressions made in neighboring intersecting regions; the present invention is not limited to those described herein.

In an example of the present invention, the total contact impedances of the depressed intersecting regions can be used to determine whether there is a single depression or multiple depressions. In addition, when it is determined that there are two depressions, two contact points that are furthest from each other can be regarded as the positions of the two depressions, respectively.

Figure 12A:
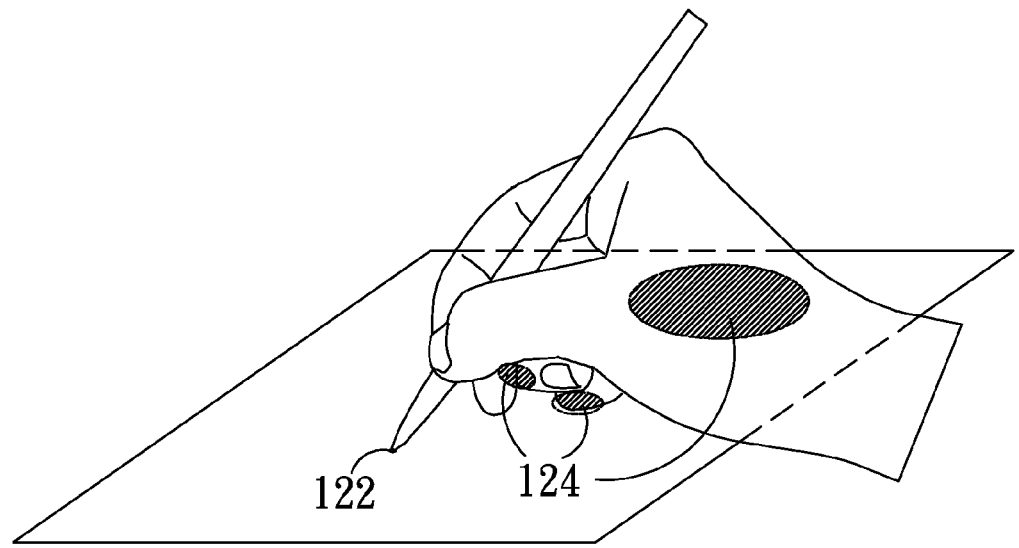
FIGS. 12A and 12B are schematic diagrams depicting the situations of writing with a pen or finger of the present invention.

As shown in FIG. 12A, when a hand holds a pen to write on sensor, the depression 122 made by the end of the pen has a small area, and thus the contact impedance of the contact point between the first and second conductive stripes is large. Conversely, the palm may have make one more palm depressions 124, which have relatively larger areas, and thus the contact impedances of the contact points between the first and second conductive stripes are relatively small. Therefore, the palm depressions 124 can be clearly identified.

Figure 12B:
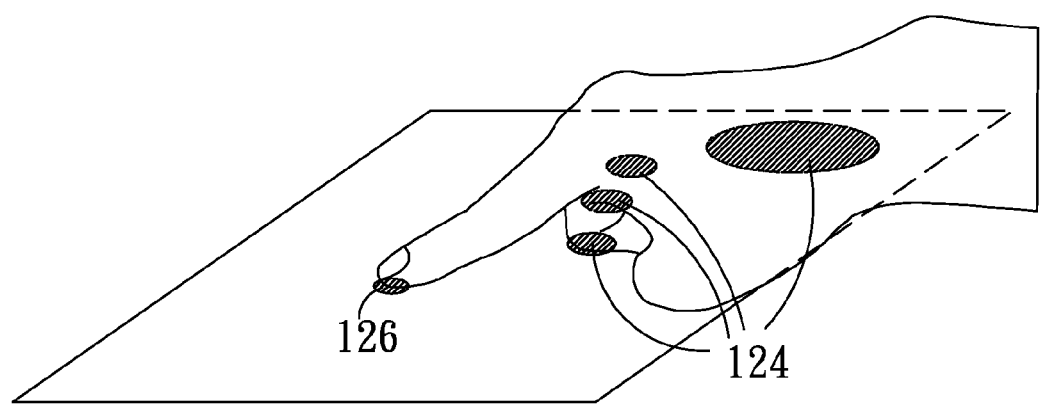
Figure 12C:
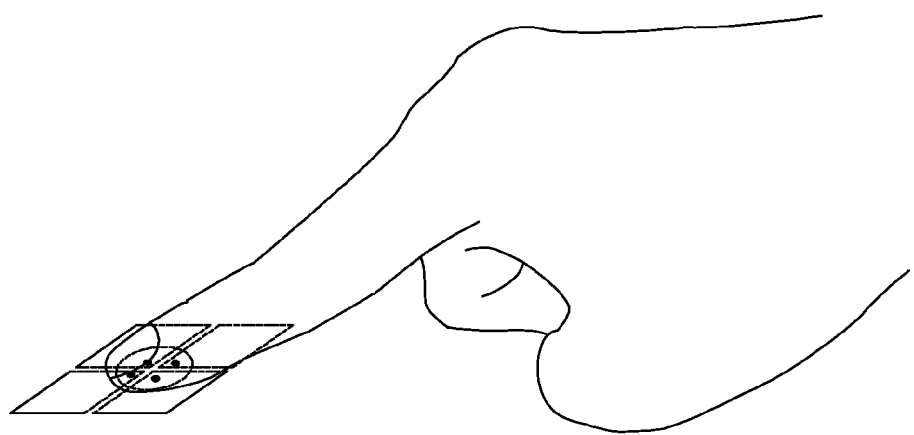
FIG. 12C is a schematic diagram depicting a finger depression.

Similarly, as shown in FIG. 12B, when a finger depresses sensor 21, the palm will also make depressions. The area of finger depression 126 is smaller than those of palm depressions 124. Therefore, the palm depressions 124 can be clearly identified. Accordingly, depressions of a pen, a finger and a palm can be distinguished based on contact impedances R between first and second conductive stripes at the depressions using different threshold values.

In addition, the calculation of contact impedances R can be performed before or after the detection of contact points. Since the detection of potential values take longer, if the calculation of contact impedances R is performed before the detection of contact points, then only contact points that are not made by palm depressions will need to be detected, thus eliminating the detection of potential values for palm contact points, which increases efficiency. Furthermore, the coordinates of a depression can be calculated by the coordinates of the center of mass of the contact points for that depression.

According to the descriptions given with respect to FIGS. 11A and 11C, in an example of the present invention, when determining whether each intersecting region is depressed, contact impedances of the depressed intersecting regions are also determined, and the total contact impedance for each depression of an object is determined based on the depressed intersecting regions for that depression. For example, whether intersecting regions are adjacent to one other is used for determining if they are caused by the same depression, and parallel contact impedances of the depressed intersecting regions of the same depression is used as the total contact impedance, and the contact points of the depressed intersecting regions of the same depression is used to determine the position of the depression. In addition, consecutive depressions made by the same object can be traced according to the total contact impedance of neighboring intersecting regions. Since that the total contact impedances made by the same moving object are similar, so if the total contact impedances detected at different timings are similar and the positions of depressions are within a predetermined ranges, these depressions can be considered as a set of continuous depressions made by the same object. Thus, the depression trajectory of a particular object can be traced by the total contact impedance in each depression of a set of continuous depressions made by the same object.

In another example of the present invention, depressed intersecting regions can be omitted based on their total contact impedances, and the contact points of these depressed intersecting regions need not be detected. For example, when at least a portion of a palm makes a depression, the palm depression can be identified and omitted based on the total contact impedance it causes. Thus, when writing with a pen or a finger, depressions made by the pen or the finger can be distinguished from that made by the palm, and only the positions of the pen/finger are of concern, i.e. detected. The trajectory of the pen/finger can be traced based on the total contact impedance of each depression in a set of continuous depressions made by the pen/finger. Herein, the present invention distinguishes depression from light contact by determining whether the conductive stripes are depressed.

Figure 13:
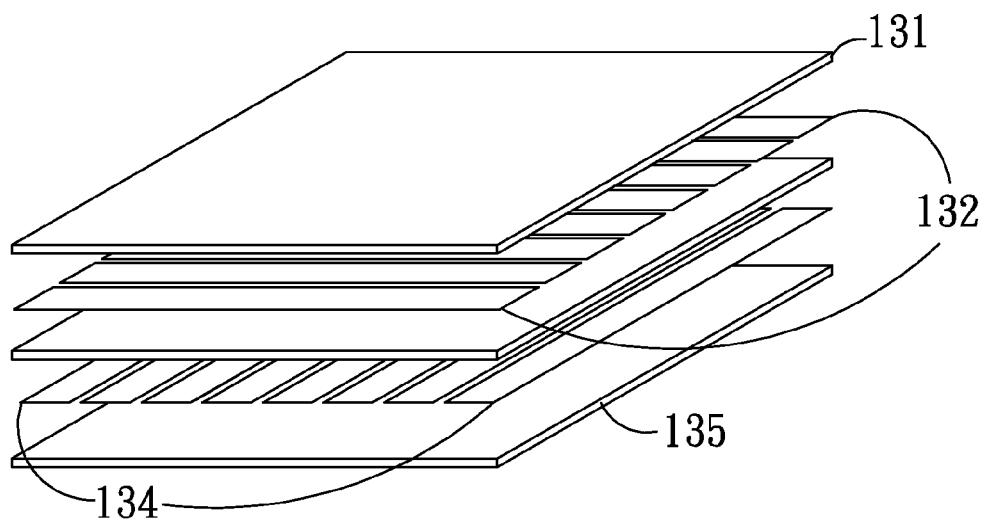
FIG. 13 is a schematic diagram depicting the structure of another device for position detection of the present invention.

In another example of the present invention, as shown in FIG. 13, a device for position detection including a piezoelectric layer is disclosed, which includes a first insulating layer 131, a first conductive stripe layer 132, a piezoelectric layer 133, a second conductive stripe layer 134 and a second insulating layer 135. The first and second conductive stripe layers 132 and 134 respectively includes said first and second conductive stripes. The piezoresistive layer 133 is insulating when under no pressure, i.e. exhibits large impedance, and when under pressure, its impedance decreases or even becomes a conductor. The piezoresistive layer 133 can thus replace said insulating spacers. When under pressure, the piezoresistive layer 133 can create an equivalent contact point due to lowered impedance.

Moreover, before the piezoresistive layer becomes a conductor, it is insulating, and capacitive contact detection can be performed. In a preferred example of the present invention, mutual-capacitive contact detection is employed. Thus, multiple light contacts can be detected while the piezoresistive is insulating. For example, one can detect which intersecting regions are contacted. In addition, when the piezoresistive layer becomes a conductor due to depression, aforementioned depression-type detection can be performed. Therefore, one can determine which intersecting regions are contacted and which intersecting region are depressed. Thus, a comparison can be made between contacted intersecting regions detected by capacitive contact detection and depressed intersecting regions detected by depression-type detection for position detection or palm omission. For example, only intersecting regions that are detected by both the capacitive and depression-type detections are subject to the determination of contact points. Further, for example, when an insulating pen is used, intersecting regions that are only detected by depression-type detection but not by capacitive detection are subject to the determination of contact points.

Accordingly, two or more multiple depression detection techniques can be combined to omit or eliminate the depressions made by a palm and identify the depressions made by a pen. For example, a capacitive detection and an infrared detection can be combined to perform depression detection with the palm omission function mentioned before. Thus, the present invention includes but is not limited to performing two or more contact or depression detections using the same sensor 21, or performing a plurality of contact or depression detections using a plurality of sensors 21. Palm omission or elimination can also be achieved based on the detection results from different contact or depression detections. The plurality of sensors may include but not limited to IR, capacitive, piezoresistive, camera-type or optical, SAW sensors.

In other words, the present invention provides a method and device for omitting palms using multiple positions detection, which includes but is not limited to defining an omitted area on a second type of contact/depression detection using a first type of contact/depression detection, wherein the omitted area may include a plurality of independent omitted areas. For example, an omitted area is defined by contacted intersecting regions detected by capacitive detection, and then those contacts in the omitted area that are further detected by optical (e.g. infrared) detection are regarded as do not exist.

In a preferred example of the present invention, a first type of detection is one that detects multiple contacts or depressions. For example, mutual-capacitive detection is performed on projective capacitive sensors to detect a plurality of contacted intersecting regions. An omitted area is then defined based on each contacted intersecting regions, for example, by expanding a certain range from each contacted intersecting region. For example, a contacted intersecting region is determined based on the capacitance change between a first and a second conductive stripe in an intersecting region. Alternatively, mutual-capacitive detection can be performed using sensors 21 described earlier, which treats all contacted intersecting regions as omitted areas. The mutual-capacitive detection determines contacted intersecting regions based on signal changes detected in each conductive stripe in a second axis when providing a driving signal to each conductive stripe in a first axis.

Alternatively, depression detection can be performed using said depression-type sensors, and then omitted areas can be defined based on depressed intersecting regions or contact points, wherein the omitted areas can be expanded to include non-depressed intersecting regions adjacent to the depressed intersecting regions based on the contact impedances of the depressed intersecting regions. For example, all depressed intersecting regions are defined as omitted areas, and the contact impedance of each depressed intersecting region is determined, and when the contact impedance of any depressed intersecting region falling within a range (e.g. smaller than a certain threshold), intersecting regions adjacent to the depressed intersecting regions with contact impedances fall within the range are also considered as omitted areas. Furthermore, the present invention further includes eliminating depressed intersecting regions or contact points depressed by a pen/finger from depressed intersecting regions based on the contact impedances of these depressed intersecting regions, and then defining the omitted areas in any of the above manners.

Figure 14:
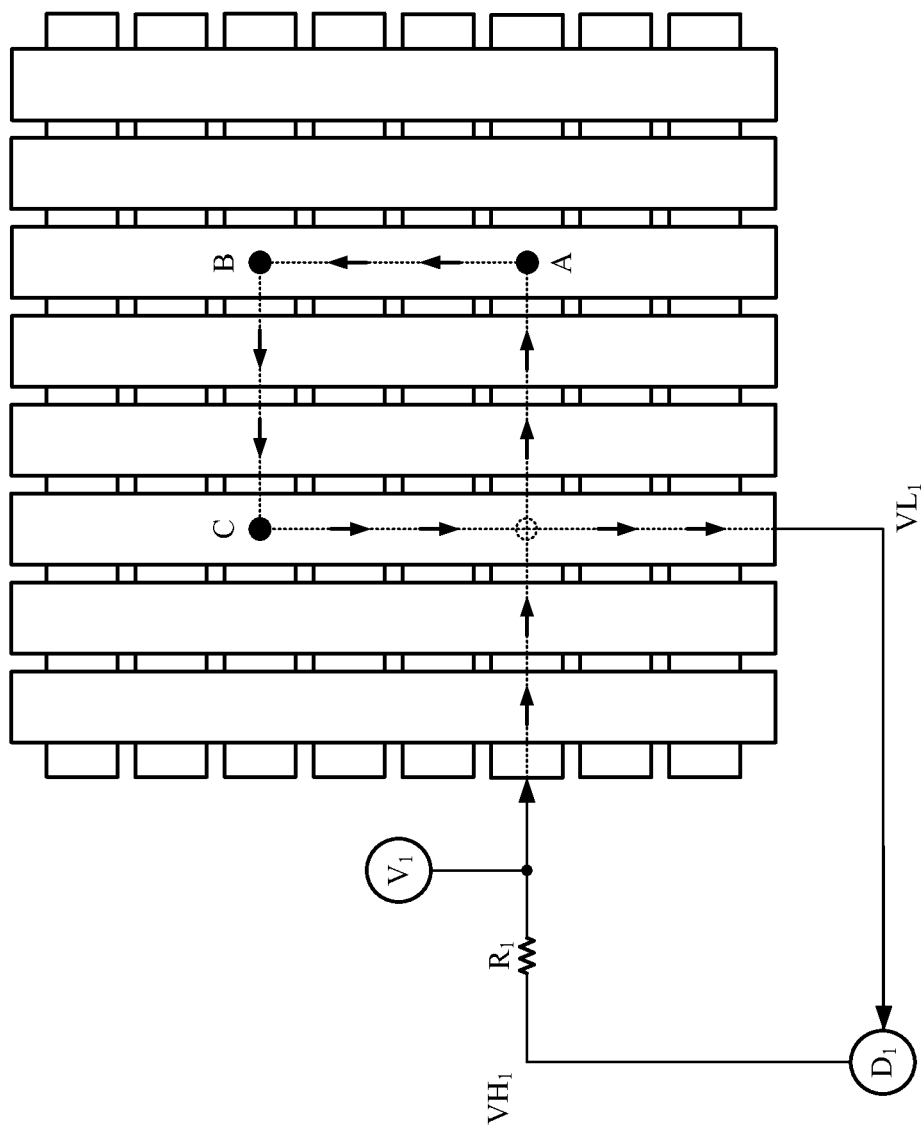
FIG. 14 is a schematic diagram depicting a misjudged depressed intersecting region.

Referring to FIGS. 4A and 14, intersecting regions A, B, and C are simultaneously depressed. When high potential VH1 and low potential VL1 are respectively provided to a first conductive stripe and a second conductive stripe in intersecting region D, even though intersecting region D is not depressed, current will flow from the first conductive stripe of intersecting region D via intersecting region A, B, and C to the second conductive stripe of intersecting region D, which forms a conduction path, and causing misjudgment of intersecting region D as a depressed intersecting region.

In addition, based on the method for detecting contact points described with respect to FIG. 6A, when high potential VH1 and low potential VL1 are respectively provided to both ends of a conductive stripe in intersecting region D, intersecting regions A, B, and C are at equal potential, so the position of contact point may be misjudged as located in intersecting region B. Accordingly, the present invention provides a method and device for detecting position misjudgment, which may omit or eliminate contact points that fall outside the detected intersecting regions during the detection of contact points of depressed intersecting regions. In an example of the present invention, the controller does not output position of any contact point that falls outside a detected intersecting region. It should be apparent to those skilled in the art that the determination of a contact point that falls within a detected intersecting region is performed within a tolerance range, for example, a contact point falls outside a certain range expanded from a depressed intersecting region will be eliminated or omitted. In an example of the present invention, the eliminated or omitted depressions may include a plurality of contact points, wherein at least one contact point falls outside the tolerance range. In another example of the present invention, the eliminated or omitted depressions may include a plurality of contact points, wherein all of the contact points fall outside the tolerance range. In an example of the present invention, intersecting regions A and B may be depressed by a palm, which cause misjudgment of intersecting region D. Thus, the above omission or elimination of misjudged contact points or depressed intersecting regions is in other words an application of palm omission or omission of palm depressions.

In an example of the present invention, the determination of contact points of detected depressed intersecting regions can be achieved by one axial position determination, that is, the determination can be achieved while detecting a first one-dimensional coordinate Px, so there is no need to detect a second one-dimensional coordinate Py.

Accordingly, in an example of the present invention, a filter procedure is further included, which can be performed by said controller. The filtering procedure includes determination of depressions to be eliminated among the depressions. Depressions to be eliminated will need to meet at least one of the following conditions: the total contact impedance is smaller than a threshold value as described before; and the position of at least one contact point in all contact points corresponding to the same depression falls outside the tolerance range of a corresponding intersecting region. In addition, the filtering procedure further includes determining every non-eliminated depression positions among all the depressions, wherein the position of each depression is determined based on the position of the contact point of the depressed intersecting region corresponding to the same depression.

In the above descriptions, the determination of contact impedances can be performed at the same time as the detection of depressed intersecting regions, that is, before the detection of contact points. Thus, by the filtering procedure above, the detection of contact points can be reduced significantly. Therefore, in an example of the present invention, the determination of contact impedances is performed before the detection of contact points, and in the filtering procedure, the determination of total contact impedances that are smaller than some threshold values is performed before the detection of contact points. In other words, in the filtering procedure, the determination of the total contact impedances that are smaller than some threshold values is first performed, and then it is determined whether the position of at least one contact point in all contact points corresponding to the same depression falls outside the tolerance range of a corresponding intersecting region.

In another example of the present invention, in the filtering procedure, it is first determined whether the position of at least one contact point in all contact points corresponding to the same depression falls outside the tolerance range of a corresponding intersecting region, and then it is determined whether the total contact impedances are smaller than the threshold values. In other words, the determination of contact points is first performed, and after misjudgments are eliminated, those depressions with the total contact impedances smaller than the threshold value are eliminated, for example, palm omission.

Figure 15A:
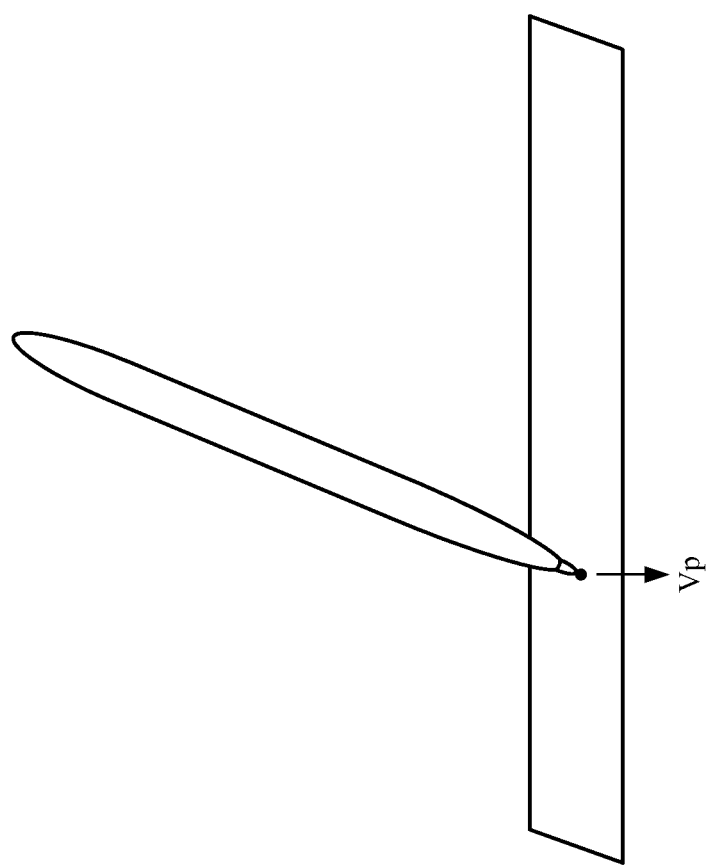
FIG. 15A is a schematic diagram depicting the detection of the position of a pen depression.
Figure 15B:
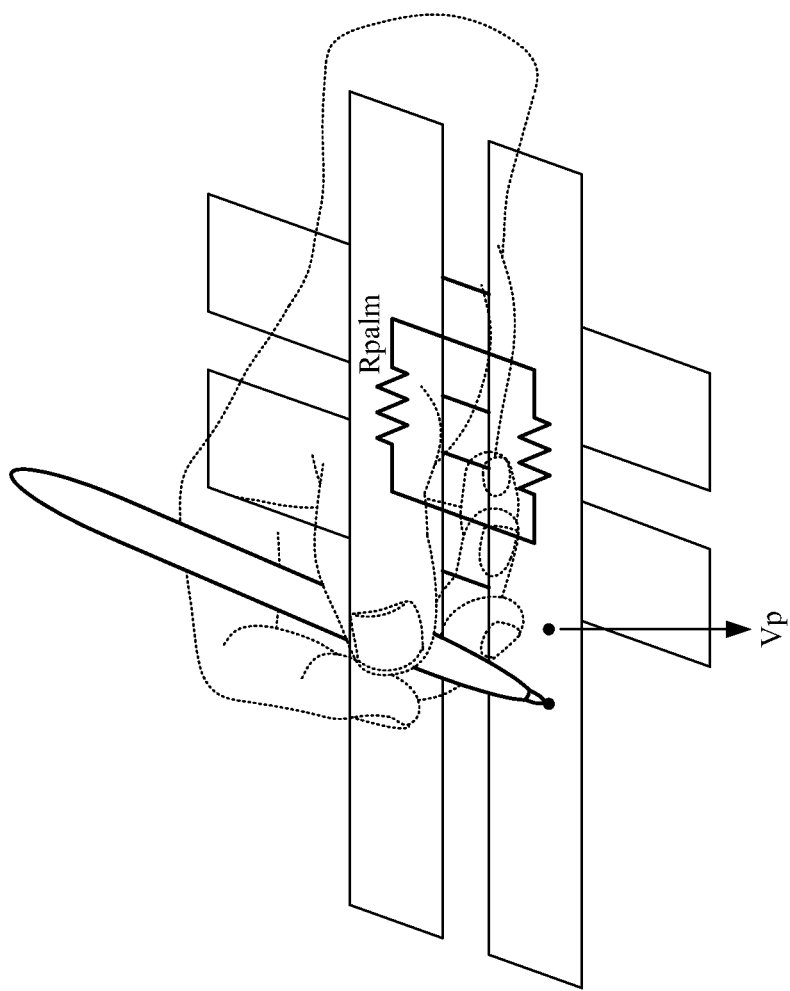
FIG. 15B is a schematic diagram depicting a positional error caused by contact impedance across intersecting regions.

Referring to FIG. 15A, when a pen depresses the sensors, based on potential Vp detected by detecting unit V2 as described before with respect to FIG. 6A, the position of depression detected is at depression position P, which is the same as the actual depression made by the pen. Referring to FIG. 15B, when a palm depresses several neighboring conductive stripes, the palm depressions may create total contact impedance Rpalm across several conductive stripes (on the same layer), so when attempting to detect the depression position P of the pen, total contact impedance Rpalm may generate error in the detection of depression position P.

Figure 16A:
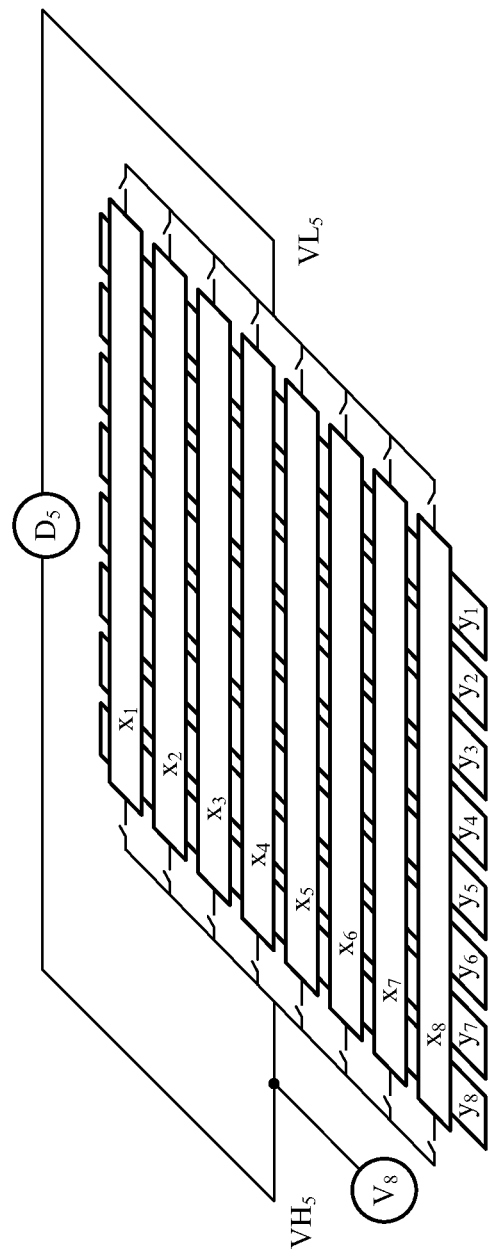
FIGS. 16A, 17A, 17B, 17C, and 17D are schematic diagrams depicting the structures for correcting positional errors caused by contact impedance across intersecting regions of the present invention.
Figure 16B:
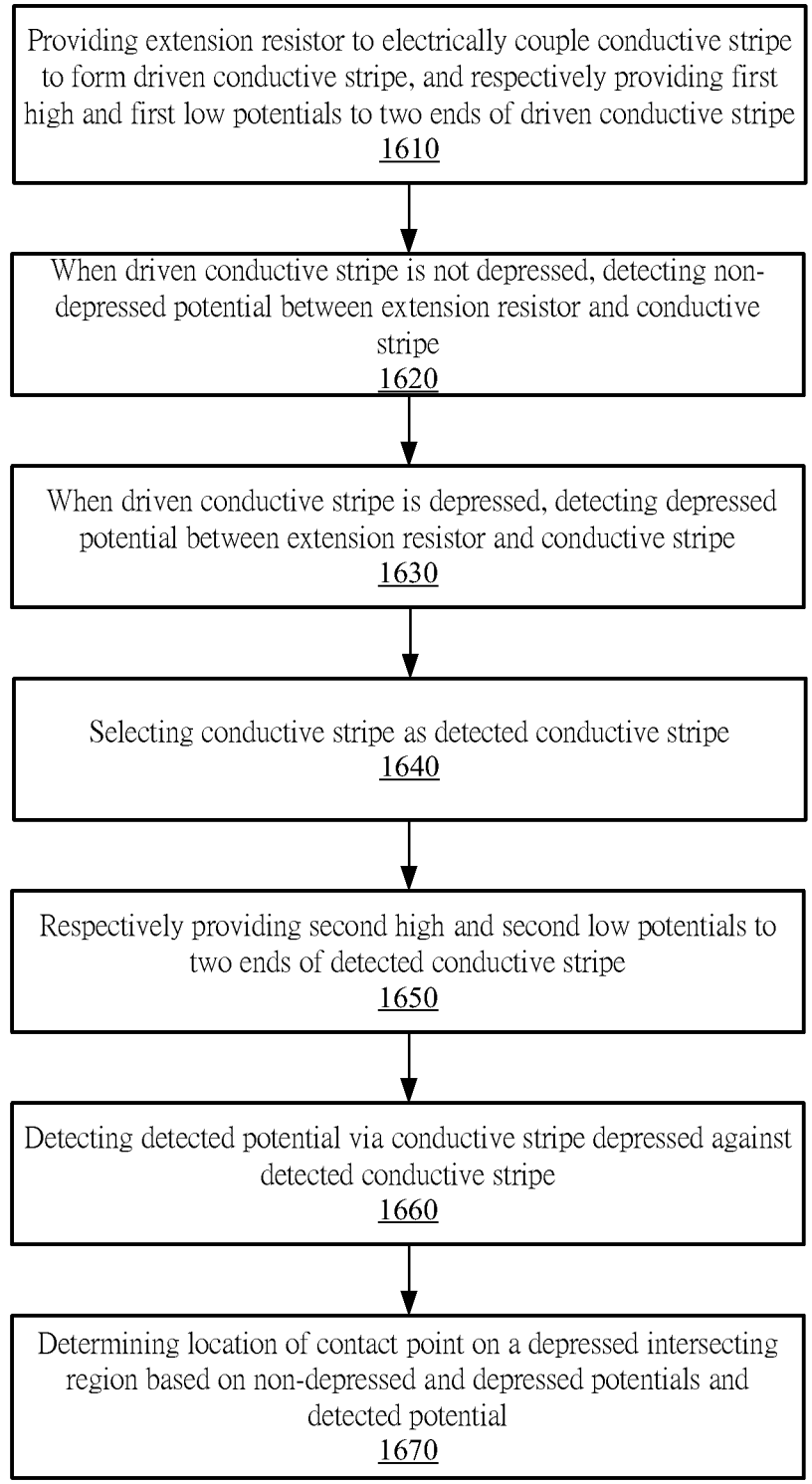
FIG. 16B is a flowchart illustrating the steps for correcting positional errors caused by contact impedance across intersecting regions of the present invention.

Referring to FIGS. 16A and 16B and the descriptions with respect to FIG. 6A, the present invention provides a method and device for correcting position detection error. First, as shown in step 1610, an extension resistor Re is provided to electrically couple a conductive stripe to create a driven conductive stripe, and first high potential VH5 and first low potential VL5 are respectively provided to both ends of the driven conductive stripe. Further, in step 1620, a non-depressed potential between the extension resistor Re and the conductive stripe is detected when the driven conductive stripe is not driven. Then, as shown in step 1630, a depressed potential between the extension resistor Re and the conductive stripe is detected when the driven conductive stripe is driven. Thereafter, as shown in step 1640, another conductive stripe is selected as a conductive stripe to be detected. Next, as shown in steps 1650 and 1660, second high potential VH2 and second low potential VL2 are respectively provided to the detected conductive stripe, and a potential is detected via a conductive stripe depressed against the detected conductive stripe. Next, as shown in step 1670, based on the non-depressed potential, the depressed potential, and the detected potential, the position of a contact point on a depressed intersecting region is determined, such as said first one-dimensional coordinate Px or second one-dimensional coordinate Py.

First high potential VH5 and first low potential VL5 are respectively provided by a driving unit D5. In an example of the present invention, Said driving units D2 and D5 and detecting units V2 and V8 include but are not limited to being integrated in said driver 23 and detector 24, respectively, and the driving of driving units D2 and D5 and detection of detecting units V2 and V8 include but are not limited to control by controller 25. Control of selector 22, driver 23, and detector 24 by controller 25 includes but is not limited to: directly or indirectly via an extension resistor respectively providing high and low potentials to a first end and second end of the same conductive stripe; directly or indirectly via an extension resistor respectively providing high and low potentials to a first end of at least a first conductive stripe and a first end of at least one second conductive stripe; detecting the signal between the conductive stripe and the extension resistor; and when high and low potentials are provided to one of a pair of depressed conductive stripes, potentials of one or both ends of the other one of the pair of depressed conductive stripes are detected, wherein when high and low potentials are respectively provided to the first and the second ends of the same conductive stripe via the extension resistor, a non-depressed potential and a depressed potential are determined based on the signal between the conductive stripe and the extension resistor.

Figure 17A:
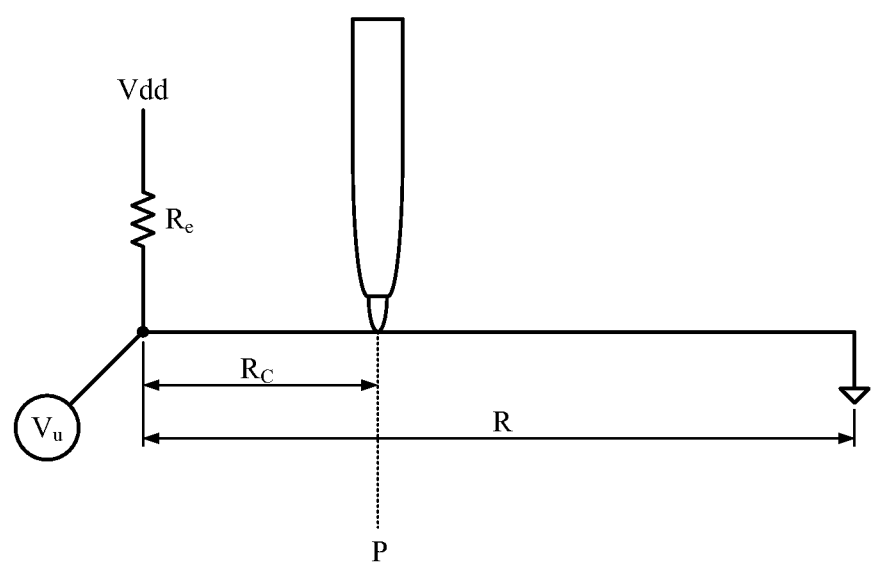
Figure 17B:
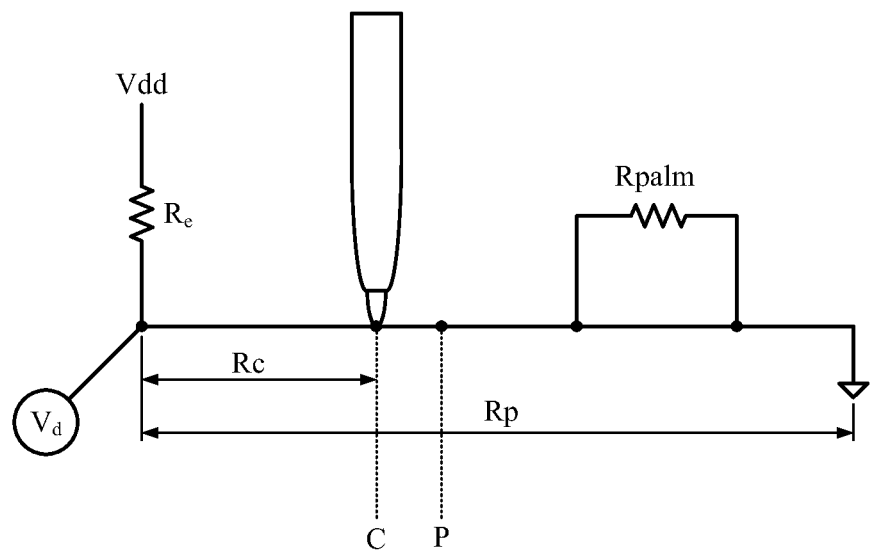
Figure 17C:
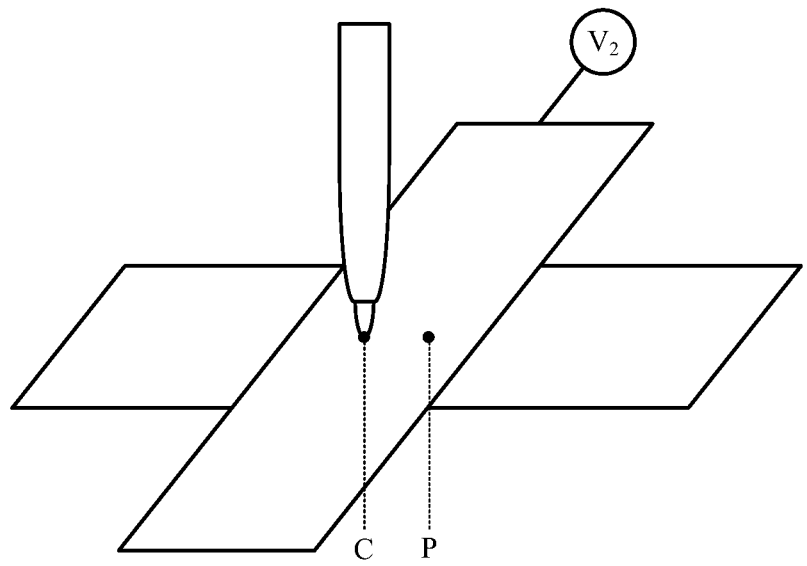

Referring to FIGS. 17A and 17B, in an example of the present invention, the impedances of the extension resistor and the detected conductive stripe are Re and R, respectively. The first high potential and the first low potential are indicated by Vdd and ground potential, respectively, wherein the ground potential is 0 at default. When only a pen depresses at location P, the impedance between the pen depression location and the extension resistor is Rc. Since the pen depression has no significant effect on the overall impedance, the overall impedance remains almost the same with the status before depression, that is, the depressed potential between the extension resistor and the conductive stripe is about the same as the non-depressed potential Vu. When impedance Rpalm of depressions (e.g. palm depressions) across conductive stripes (across conductive stripe on the same layer) is detected, the correct location is location C, the impedance of the conductive stripe is Rp, and the depressed potential is Vd. In addition, the detection of location P is based on potential Vp detected by detecting unit V2.

From the above, the following equations can be obtained. Referring to FIG. 17A, $$\frac{Vu}{Vdd} = \frac{R}{Re+R} \rightarrow \frac{Vdd}{Vu} = 1 + \frac{Re}{R} \rightarrow \frac{Re}{R} = \frac{Vdd-Vu}{Vu}$$

Referring to FIG. 17B, $$\frac{Vd}{Vdd} = \frac{Rp}{Re+Rp} \rightarrow \frac{Vdd}{Vu} = 1 + \frac{Re}{R} \rightarrow \frac{Re}{R} = \frac{Vdd-Vu}{Vu}$$

In addition, $$\frac{Vp}{Vdd} = \frac{Rp-Rc}{Rp} = 1 - \frac{Rc}{Rp} \rightarrow \frac{Rc}{Rp} = 1 - \frac{Vp}{Vdd} = \frac{Vdd-Vp}{Vdd}$$

$$Rc = Rp \cdot \frac{Vdd-Vp}{Vdd}$$

Referring to FIG. 17A again, $$\frac{Vc}{Vdd} = \frac{R-Rc}{R}$$
$$= \frac{R - Rp \cdot \frac{Vdd-Vp}{Vdd}}{R}$$
$$= 1 - Rp \cdot \frac{Vdd-Vp}{Vdd}$$
$$= 1 - \frac{Vdd-Vu}{Vu} \cdot \frac{Vd}{Vdd-Vd} \cdot \frac{Vdd-Vp}{Vdd}$$

$$\overset{\circ}{V}c = Vdd - \frac{Vdd-Vu}{Vu} \cdot \frac{Vd \cdot (Vdd-Vp)}{Vdd-Vd}$$
$$= Vp + \Delta V$$

$$\Delta V = Vdd - \frac{Vdd-Vu}{Vu} \cdot \frac{Vd \cdot (Vdd-Vp)}{Vdd-Vd} - Vp$$
$$= (Vdd-Vp) - \frac{Vdd-Vu}{Vu} \cdot \frac{Vd \cdot (Vdd-Vp)}{Vdd-Vd}$$
$$= (Vdd-Vp)\left(1 - \frac{Vdd-Vu}{Vu} \cdot \frac{Vd}{Vdd-Vd}\right)$$
$$= (Vdd-Vp) \cdot \frac{Vu \cdot Vdd - Vu \cdot Vd - Vdd \cdot Vd + Vu \cdot Vd}{Vu \cdot (Vdd-Vd)}$$

$$\Delta V = (Vdd-Vp) \cdot \frac{Vdd(Vu-Vd)}{Vu \cdot (Vdd-Vd)}$$

Compared to contact point C, when a depression across conductive stripes is closer to the lower potential, $$Vc = Vdd - \frac{Vdd-Vu}{Vu} \cdot \frac{Vd \cdot (Vdd-Vp)}{Vdd-Vd} = Vp + \Delta V,$$

that is, when the potential difference between the high and low potentials is known, based on the non-depressed potential Vu, the depressed potential Vd, the detected potential Vp, the error in the detected potential Vp can be corrected to create the correct detected potential Vc.

Figure 17D:
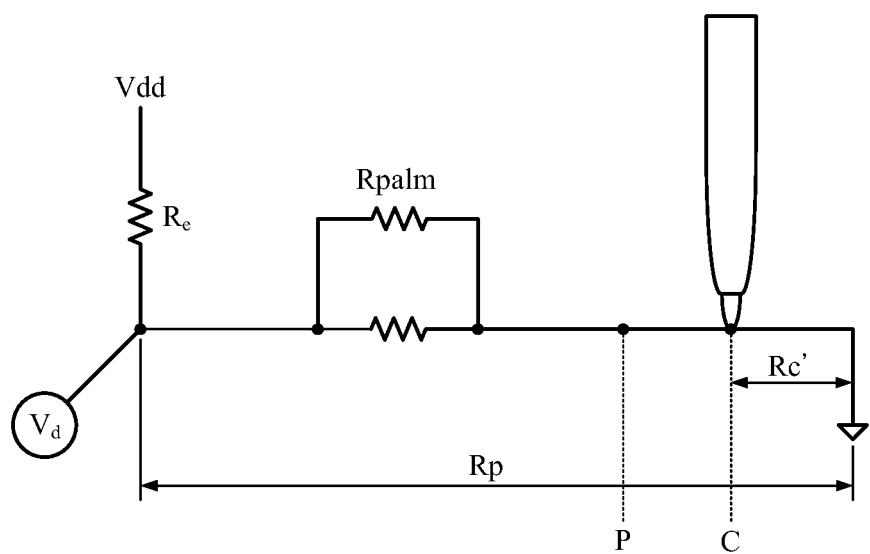

Similarly, when a depression across conductive stripes is closer to the higher potential, as shown FIG. 17D, the following equations can be obtained.

$$\frac{Vc}{Vdd} = \frac{Rc'}{R}$$

$$\frac{Vp}{Vdd} = \frac{Rc'}{Rp} \rightarrow Rc' = Rp \cdot \frac{Vp}{Vdd}$$

$$\frac{Vc}{Vdd} = \frac{Rp}{R} \cdot \frac{Vp}{Vdd}$$

$$Vc = \frac{Rp \cdot Vp}{R}$$

$$= Vp \cdot \frac{Vdd - Vu}{Vu} \cdot \frac{Vd}{Vdd - Vd}$$

$$= Vp - Vp + Vp \cdot \frac{Vdd - Vu}{Vu} \cdot \frac{Vd}{Vdd - Vd}$$

$$= Vp + Vp \cdot \left(\frac{Vdd - Vu}{Vu} \cdot \frac{Vd}{Vdd - Vd} - 1\right)$$

$$= Vp + Vp \cdot \frac{Vdd \cdot Vd - Vu \cdot Vd - Vdd \cdot Vu + Vu \cdot Vd}{Vu(Vdd - Vd)}$$

$$= Vp + Vp \cdot \frac{Vdd(Vd - Vu)}{Vu(Vdd - Vd)}$$

$$= Vp + \Delta V'$$

$$\Delta V' = Vp \cdot \frac{Vdd(Vd - Vu)}{Vu(Vdd - Vd)}$$

Compared to contact point C, when a depression across conductive stripes is closer to the higher potential, $$Vc = Vp + Vp \cdot \frac{Vdd(Vd - Vu)}{Vu(Vdd - Vd)} = Vp + \Delta V',$$

that is, when the potential difference between the high and low potentials is known, based on the non-depressed potential Vu, the depressed potential Vd, the detected potential Vp, the error in the detected potential Vp can be corrected to create the correct detected potential Vc. Furthermore, it can be seen from Vc=Vp+ΔV" and $$\Delta V' = Vp \cdot \frac{Vdd(Vd - Vu)}{Vu(Vdd - Vd)},$$

the amount of positional error is proportional to the position. That is, the proportion of positional error on a conductive stripe having contact impedance that crosses intersecting regions can be determined from the non-depressed potential Vu and the depressed potential Vd. Accordingly, in an example of the present invention, the proportion of positional error on a conductive stripe having contact impedance that crosses intersecting regions (crosses conductive stripes on the same layer) is determined based on the change in the potential at a position (e.g. the first end or second end) on the conductive stripe. In fact, knowing the proportion of positional error implies that the positional error is also known. In other words, the amount of positional error on a conductive stripe having contact impedance that crosses intersecting regions is based on the change in the potential at a position (e.g. the first end or second end) on the conductive stripe.

From the descriptions above, compared to contact point C, when a depression across conductive stripes is closer to the higher potential, $$Vc = (Vp - VL) - (Vp - VL) \cdot \frac{(VH - VL) \cdot (Vu - Vd)}{(Vu - VL)(VH - Vd)},$$

and when a depression across conductive stripes is closer to the lower potential, $$Vc = (Vp - VL) - (Vp - VH) \cdot \frac{(VH - VL) \cdot (Vu - Vd)}{(Vu - VL)(VH - Vd)},$$

the proportion of error is $$\frac{(VH - VL) \cdot (Vu - Vd)}{(Vu - VL)(VH - Vd)}.$$

In other words, when detecting a contact point, the present invention corrects the error of the detected potential Vp based on the non-depressed potential Vu and the depressed potential Vd to determine the correct location C of the contact point.

In a best mode of the present invention, depressed conductive stripes are detected first, and then depressed intersecting regions are detected, as indicated by previous descriptions with respect to FIGS. 4A to 4C, 7 to 8C, 11A, and 11B. In addition, it further includes palm omission based on the total contact impedance as described earlier, and after correction of positional error, position misjudgments are identified and any misjudged depression is omitted or eliminated. Finally, the detection of contact points is carried out to determine the coordinates of the center of mass of the contact point for each depression as the position of each depression.

The above examples are only used to illustrate the principles of the present invention, and they should not be construed as to limit the present invention in any way. The above examples can be modified by those with ordinary skills in the arts without departing from the scope of the present invention as defined in the following appended claims.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for determining impedance of depression, comprising:

providing a plurality of intersecting regions constituted by a plurality of intersecting conductive stripes, wherein a pair of depressed conductive stripes intersected in an intersecting region from a contact point due to electrical contact so as to define a depressed intersecting region; and determining a contact impedance, wherein the contact impedance of each depressed intersecting region is determined based on the potentials at the contact point of one and the other of the pair of conductive stripes or the position of the contact point, wherein the determination of contact impedance further comprises:

determining a first dimensional location and a second dimensional location of the contact point, and determining a first dimensional impedance and a second dimensional impedance based on the first dimensional location and the second dimensional location;

detecting a first contact potential and a second contact potential of one and the other of the pair of conductive stripes when providing high and low potentials to one and the other of the pair of conductive stripes, respectively; and determining the contact impedance according to the first dimensional impedance, the second dimensional impedance, the high potential, the low potential, the first contact potential, and the second contact potential.

2. The method for determining impedance of depression of claim 1, wherein the contact impedance is $(R1+R2)/(((VH-VL)/(P1-P2))-1)$, wherein $R1$, $R2$, $VH$, $VL$, $P1$, and $P2$ are the first dimensional impedance, the second dimensional impedance, the high potential, the low potential, the first contact potential, and the second contact potential, respectively.

3. The method for determining impedance of depression of claim 1, wherein the determination of the position of the contact point on the depressed intersecting region comprises:

sequentially selecting one and the other of the pair of conductive stripes as a driven conductive stripe and a detected conductive stripe, respectively;

detecting the potential of the detected conductive stripe as a positional potential when providing high and low potentials to both ends of the driven conductive stripe; and determining the first dimensional location and the second dimensional location based on the detected positional potentials of one and the other of the pair of conductive stripes, respectively.

4. The method for determining impedance of depression of claim 1, wherein the determination of the position of the contact point on the depressed intersecting region comprises:

sequentially selecting one and the other of the pair of conductive stripes as a driven conductive stripe and a detected conductive stripe, respectively;

detecting the potential of the detected conductive stripe as a positional potential when providing high and low potentials to both ends of the driven conductive stripe;

electrically coupling an extension resistor and the driven conductive stripe to form an extension conductive stripe;

providing high and low potentials to the extension conductive stripe to detect the potential between the extension resistor and the driven conductive stripe as a non-depressed potential when the extension conductive stripe is not depressed;

providing high and low potentials to the extension conductive stripe to detect the potential between the extension resistor and the driven conductive stripe as a depressed potential when the extension conductive stripe is depressed; and determining the first dimensional location and the second dimensional location based on the detected positional potentials of one and the other of the pair of conductive stripes, the non-depressed and depressed potentials of the driven conductive stripe.

5. A method for determining impedance of depression, comprising:

providing a plurality of intersecting regions constituted by a plurality of intersecting conductive stripes, wherein a pair of depressed conductive stripes intersected in an intersecting region from a contact point due to electrical contact so as to define a depressed intersecting region;

determining a contact impedance, wherein the contact impedance of each depressed intersecting region is determined based on the potentials at the contact point of one and the other of the pair of conductive stripes or the position of the contact point;

determining a depression on each depressed intersecting region;

determining a total contact impedance for each depression, wherein the total contact impedance is the parallel impedance of contact impedances of all depressed intersecting regions corresponding to the same depression;

regarding the depression as do not exist when the total contact impedance of the depression is smaller than a threshold value; and determining a depression location of each depression which is not yet regarded as do not exist, wherein the depression location is determined based on the contact points on all depressed intersecting regions corresponding to each depression.

6. The method for determining impedance of depression of claim 5, further comprising:

determining the misjudgment of the depressed intersecting region by determining whether the position of the contact point is within a predetermine range of the corresponding intersecting region;

determining the misjudgment of the depression based on the misjudgment of the depressed intersecting region if the misjudgment of the depressed intersecting region is determined; and regarding the misjudged depression as do not exist.

7. A method for determining impedance of depression, comprising:

providing a plurality of intersecting regions constituted by a plurality of intersecting conductive stripes, wherein a pair of depressed conductive stripes intersected in an intersecting region from a contact point due to electrical contact so as to define a depressed intersecting region;

determining a contact impedance, wherein the contact impedance of each depressed intersecting region is determined based on the potentials at the contact point of one and the other of the pair of conductive stripes or the position of the contact point;

determining a depression on each depressed intersecting region;

determining a total contact impedance for each depression, wherein the total contact impedance is the parallel impedance of contact impedances of all depressed intersecting regions corresponding to the same depression; and tracing subsequent depressions of each depression based on the total compact impedance of each depression, wherein the differences of total compact impedances of each depression and its each subsequent depression will be within a predetermine range, and the depressed intersecting regions corresponding to the same depression will be neighboring intersecting regions.

8. The method for determining impedance of depression of claim 7, further comprising the following operation that when depressed intersecting regions of a first subsequent depression corresponding to a first depression and of a second subsequent depression corresponding to a second depression are adjacent to each other, these two depressions can be determined to be not made by the same finger based on the total contact impedance of the first depression and the total contact impedance of the second depression.

* * * * *